(12) United States Patent
Nakagawa et al.

(10) Patent No.: US 10,599,382 B2
(45) Date of Patent: Mar. 24, 2020

(54) INFORMATION PROCESSING DEVICE AND INFORMATION PROCESSING METHOD FOR INDICATING A POSITION OUTSIDE A DISPLAY REGION

(71) Applicant: SONY CORPORATION, Tokyo (JP)

(72) Inventors: Toshiyuki Nakagawa, Kanagawa (JP);
Hirotaka Ishikawa, Kanagawa (JP);
Yasuki Kanema, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/392,967

(22) Filed: Apr. 24, 2019

(65) Prior Publication Data
US 2019/0250875 A1    Aug. 15, 2019

Related U.S. Application Data

(63) Continuation of application No. 15/825,435, filed on Nov. 29, 2017, now Pat. No. 10,303,421, which is a (Continued)

(30) Foreign Application Priority Data

Nov. 5, 2013 (JP) .................................. 2013-229121

(51) Int. Cl.
*G06F 3/16* (2006.01)
*G06F 3/01* (2006.01)
(Continued)

(52) U.S. Cl.
CPC ........... *G06F 3/16* (2013.01); *G02B 27/0172* (2013.01); *G02B 27/0179* (2013.01);
(Continued)

(58) Field of Classification Search
CPC . G06F 3/16; G06F 3/012; G06F 3/167; G06F 3/04815; H04S 7/30; H04S 7/40;
(Continued)

(56) References Cited

U.S. PATENT DOCUMENTS 9,851,936 B2    12/2017  Nakagawa et al.
2003/0007648 A1 *  1/2003  Currell ...................... H04S 7/30
                                                                         381/61
(Continued)

FOREIGN PATENT DOCUMENTS

CN          104067633 A     9/2014
EP          2810454 A1     12/2014
(Continued)

OTHER PUBLICATIONS

Notice of Allowance and Fees Due for U.S. Appl. No. 15/825,435, dated Mar. 5, 2019, 02 pages.
(Continued)

*Primary Examiner* — Maurice L. McDowell, Jr.
*Assistant Examiner* — Donna J. Ricks
(74) *Attorney, Agent, or Firm* — Chip Law Group

(57) ABSTRACT

The present technology relates to an information processing device, an information processing method, and a program that can more exactly indicate a position outside a display region. An outside-display-region-position designation unit designates a position outside a display region of an image display unit, and a drawing/sound control unit controls output of a sound of an AR object from a sound output unit while moving the AR objet toward the designated position. The present technology can be applied to a wearable computer, for example, a glasses-type device having a pair of image display units for a left eye and a right eye.

12 Claims, 33 Drawing Sheets

Related U.S. Application Data continuation of application No. 15/031,724, filed as application No. PCT/JP2014/078305 on Oct. 24, 2014, now Pat. No. 9,851,936.

(51) Int. Cl.
| | | |
|---|---|---|
| *G06F 3/0481* | (2013.01) | |
| *H04S 7/00* | (2006.01) | |
| *G02B 27/01* | (2006.01) | |
| *G06T 19/00* | (2011.01) | |

(52) U.S. Cl.
CPC ......... *G06F 3/012* (2013.01); *G06F 3/04815* (2013.01); *G06F 3/167* (2013.01); *G06T 19/006* (2013.01); *H04S 7/30* (2013.01); *H04S 7/40* (2013.01); *G02B 2027/014* (2013.01); *G02B 2027/0132* (2013.01); *G02B 2027/0178* (2013.01); *H04S 2400/11* (2013.01)

(58) Field of Classification Search
CPC .............. H04S 2400/11; G06T 19/006; G02B 27/0179; G02B 27/0172; G02B 2027/014; G02B 2027/0132; G02B 2027/0178
See application file for complete search history.

(56) References Cited

U.S. PATENT DOCUMENTS

| 2011/0040395 | A1* | 2/2011 | Kraemer | G10L 19/00 |
| | | | | 700/94 |
| 2013/0290876 | A1 | 10/2013 | Anderson et al. | |
| 2013/0328927 | A1 | 12/2013 | Mount et al. | |
| 2014/0300636 | A1 | 10/2014 | Miyazaya et al. | |
| 2014/0375683 | A1 | 12/2014 | Salter et al. | |
| 2016/0071320 | A1* | 3/2016 | Smith | G06T 19/006 |
| | | | | 345/633 |
| 2016/0133263 | A1* | 5/2016 | Borss | H04S 3/008 |
| | | | | 381/22 |
| 2017/0208415 | A1* | 7/2017 | Ojala | A63F 13/54 |

FOREIGN PATENT DOCUMENTS

| JP | 2003-134510 | A | 5/2003 | |
| JP | 2003-134510 | * | 8/2003 | ............... H04N 7/18 |
| JP | 2005-241385 | A | 9/2005 | |
| JP | 2012-216135 | A | 11/2012 | |
| JP | 2013-162285 | A | 8/2013 | |
| WO | 2013/114831 | A1 | 8/2013 | |
| WO | WO 2013-114831 | * | 8/2013 | ............. H04R 5/033 |

OTHER PUBLICATIONS

Notice of Allowance and Fees Due for U.S. Appl. No. 15/825,435, dated Jan. 23, 2019, 08 pages.

Non-Final Rejection for U.S. Appl. No. 15/825,435, dated Sep. 18, 2018, 10 pages.

Non-Final Rejection for U.S. Appl. No. 15/825,435, dated Mar. 13, 2018, 13 pages.

Office Action for JP Patent Application No. 2015-546599, dated Jan. 31, 2019, 03 pages of Office Action and 03 pages of English Translation.

Office Action for JP Patent Application No. 2015-546599, dated Jun. 26, 2018, 03 pages of Office Action and 03 pages of English Translation.

Office Action for CN Patent Application No. 201480059236.0, dated May 3, 2018, 07 pages of Office Action and 14 pages of English Translation.

Notice of Allowance and Fees Due for U.S. Appl. No. 15/031,724, dated Aug. 22, 2017, 08 pages.

Non-Final Office Action for U.S. Appl. No. 15/031,724, dated Jan. 17, 2017, 20 pages.

International Preliminary Report on Patentability of PCT Application No. PCT/JP2014/078305, dated May 19, 2016, 06 pages of English Translation and 05 pages of IPRP.

International Search Report and Written Opinion of PCT Application No. PCT/JP2014/078305, dated Jan. 20, 2015, 06 pages of English Translation and 07 pages of ISRWO.

\* cited by examiner

INFORMATION PROCESSING DEVICE AND INFORMATION PROCESSING METHOD FOR INDICATING A POSITION OUTSIDE A DISPLAY REGION

CROSS-REFERENCE TO RELATED APPLICATION

The present application is a continuation application of U.S. patent application Ser. No. 15/825,435, filed Nov. 29, 2017, which is a continuation application of U.S. patent application Ser. No. 15/031,724, filed Apr. 23, 2016, now U.S. Pat. No. 9,851,936, which is a national stage entry of PCT/JP2014/078305, filed Oct. 24, 2014, which claims priority from prior Japanese Priority Patent Application JP 2013-229121 filed in the Japan Patent Office on Nov. 5, 2013, the entire content of which is hereby incorporated by reference.

TECHNICAL FIELD

The present technology relates to an information processing device, an information processing method, and a program, and particularly relates to an information processing device, an information processing method, and a program which can more exactly indicate a position outside a display region.

BACKGROUND ART

In recent years, research on wearable computers that users can carry while walking have been conducted (for example, Patent Literature 1). As such a kind of wearable computer, a display device that can be mounted in a head like a head-mounted display (which will be referred to as an HMD) or the like is known.

In addition, a technology called augmented reality (AR) that presents virtual content overlaid on an object of a real space to users has gained attention (for example, refer to Patent Literature 2). By using this AR technology, for example, information (AR object) of a scene that a user sees through a transmissive-type display such as an HMD can be displayed overlaid on a place in accordance with a current position of the user.

Furthermore, Patent Literature 3 discloses a technology of controlling reproduction of music sources based on a current position of a user and a direction specified according to a path to a destination.

CITATION LIST

Patent Literature

Patent Literature 1: JP 2011-28763A
Patent Literature 2: JP 2013-92964A
Patent Literature 3: JP 2003-028663A

SUMMARY OF INVENTION

Technical Problem

Since only a limited region can be displayed in a display such as an HMD as described above, there are cases in which it is difficult to display not only information of the inside of the field of view of a user but also information of the outside of the field of view of the user in that narrow display region. Consequently, despite the fact that display of information using an image is intuitive and explicit, a limited region can be displayed on a display, and thus there is a limitation on displaying all of the information.

In addition, in Patent Literature 3 described above, a user can recognize left and right positions on a straight line because headphones use two channels for reproduction; and when stereoscopic sounds are expressed using a head-related transfer function (HRTF), however, there is a possibility of mistakenly recognizing front and back sides if only a sound is used for position display. One of reasons therefor is that, when the HRTF is not the user's, a sound is heard in a different way from the way the user normally hears sounds of the natural world with his or her ears, and thus the user may not be able to catch the position of the sound. In addition, even if the HRTF is the user's, the way of hearing may be different owing to a characteristic of headphones or a reproduction device performing the reproduction.

As described above, there is a demand for indicating information of the outside of a display region of a display device that has a limited display region, but even if the sound reproduction method disclosed in Patent Literature 3 is used, it is not possible to exactly indicate information of the outside of the display region.

The present technology takes the above circumstances into consideration, and aims to more exactly indicate a position outside a display region.

Solution to Problem

According to an aspect of the present technology, an information processing device includes: an image display unit configured to display an image; a sound output unit configured to output a sound; a position designation unit configured to designate a position outside a display region of the image display unit; and a control unit configured to control output of a sound of an augmented reality (AR) object while moving the AR object toward the designated position.

The control unit may cause an image of the AR object to be displayed when the AR object passes through the display region of the image display unit. There may be a plurality of AR objects.

The control unit may cause the AR objects to move on both sides of a user when the AR objects move toward the designated position.

The control unit may cause sounds of the plurality of AR objects to be output at different timings.

The information processing device may further include a detection unit configured to detect a direction of the image display unit. The control unit may cause the AR object to move according to the direction of the image display unit.

The control unit may cause the AR object to move in a manner that the image of the AR object is displayed in the display region.

The control unit may cause an output position of a sound of the AR object to be the same as a display position of the image of the AR object inside the display region.

The control unit may cause an output position of a sound of the AR object to be different from a display position of the image of the AR object inside the display region.

The information processing device may be a glasses-type device having a pair of the image display units for a left eye and a right eye.

The information processing device may be an independent device or an internal block constituting one device.

An information processing method and a program according to an aspect of the present technology are an information processing method and a program that are compatible with an information processing device according to an aspect of the present technology.

In an information processing device, information processing method, and the program according to an aspect of the present technology, a position outside a display region of an image display unit is designated, and output of a sound of an AR object from a sound output unit is controlled while moving the AR object toward the designated position.

Advantageous Effects of Invention

According to an aspect of the present technology, it is possible to more exactly indicate a position outside a display region.
Note that the effect disclosed herein is not necessarily limitative, and any effect disclosed in the present disclosure may be exhibited.

DESCRIPTION OF EMBODIMENTS

Figure 1:
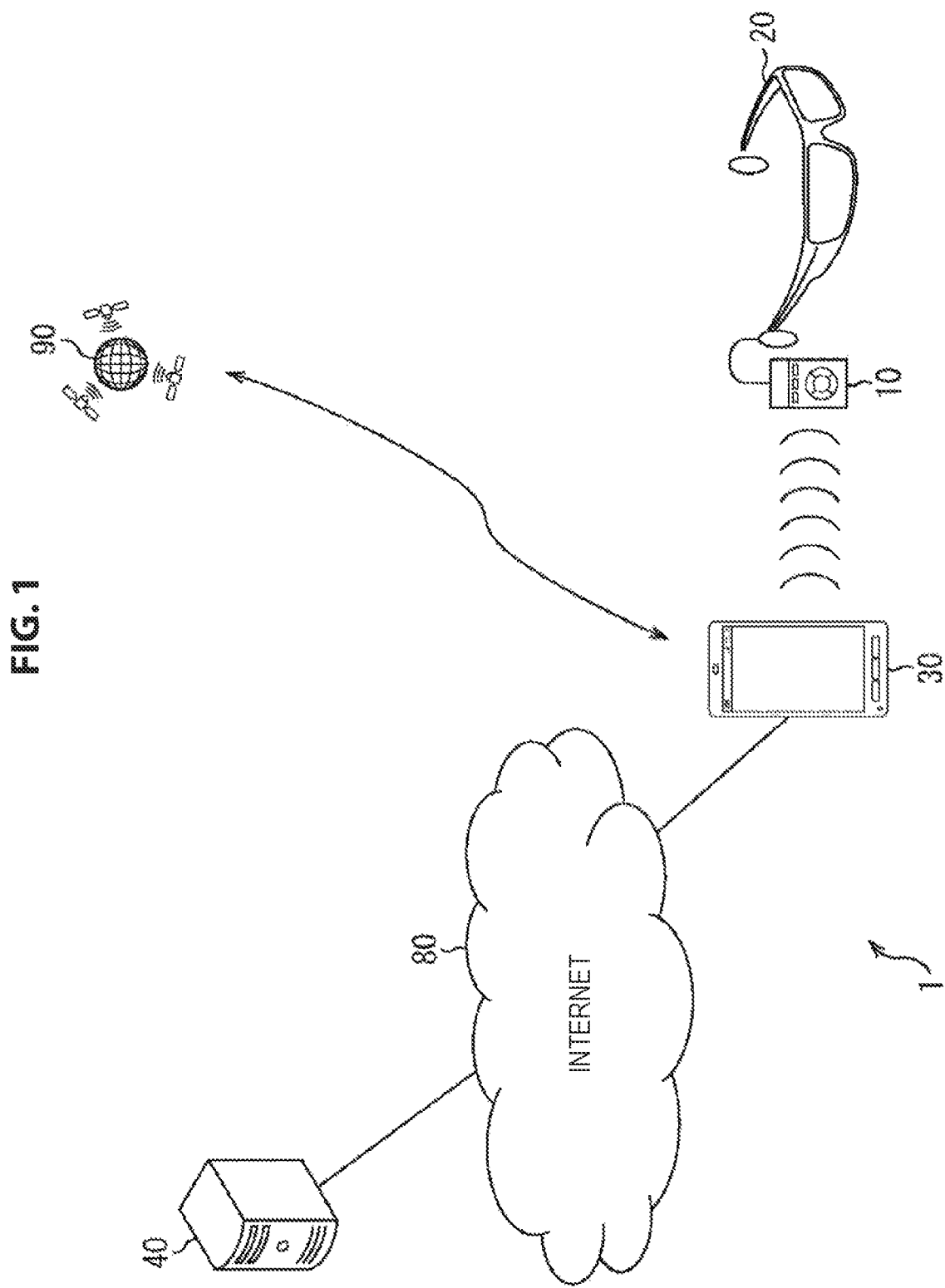
FIG. 1 is a block diagram showing a configuration of an embodiment of an AR system to which the present technology is applied.

Embodiments of the present technology will be described below with reference to the drawings.
<Configuration of an AR System>
FIG. 1 is a block diagram showing a configuration of an embodiment of an AR system to which the present technology is applied.
The AR system 1 presents information with respect to a current position of a user wearing a head-mounted display (HMD) 20 to the user using an augmented reality (AR) technology. As shown in FIG. 1, the AR system 1 is constituted by a control box 10, the HMD 20, a smartphone 30, and an AR server 40. The control box 10 and the HMD 20 are connected to each other by a cable that conforms to a predetermined standard. In addition, the smartphone 30 and the AR server 40 are connected to each other via a wireless network, the Internet 80, or the like.
The control box 10, which is an apparatus for controlling the HMD 20, controls operations of the HMD 20 according to manipulations of various buttons by the user. The HMD 20, which is an example of a wearable computer, is a glasses-type device having transmissive-type displays, headphones, and the like. The HMD 20 has a pair of transmissive-type displays for a left eye and a right eye disposed at the positions of lenses that are placed in the frame of normal glasses, and is worn on the head of the user.
In addition, the control box 10 has a short-range wireless communication unit, and can perform wireless communication with the smartphone 30 based on a short-range wireless communication standard such as Bluetooth (registered trademark) to exchange various kinds of data. The smartphone 30 has a Global Positioning System (GPS) function, and can acquire a current position of the user wearing the HMD 20 by receiving signals from a GPS satellite 90. Then, the smartphone 30 transmits information indicating the current position to the AR server 40 via the Internet 80 to acquire AR object information of the current position. The smartphone 30 transmits the AR object information to the control box 10 through wireless communication.
Here, the AR object information includes information of coordinates, images, sounds, and the like. Coordinate information refers to, for example, the coordinates of an AR object on a cylindrical coordinate system around the user wearing the HMD 20 indicating a disposed position thereof. Image information refers to information regarding an image displayed as the AR object. In addition, sound information refers to information regarding a sound indicating the AR object. In the description below, image information of an AR object will be referred to as an "image object" and sound information thereof will be referred to as a "sound object."

The AR object information, however, at least includes an image object and coordinate information thereof, and the information arbitrarily includes a sound object. Thus, among AR objects, one that includes a sound object in particular will be referred to as a "sound-added AR object." In addition, a sound object further includes image information, and an image thereof will be referred to as a "sound object image."

The control box 10 outputs the AR object information received from the smartphone 30 to the HMD 20. Accordingly, for example, an image object that relates to an object that the user wearing the HMD 20 sees through the transmissive-type displays can be overlaid and displayed on the object. In addition, a sound that corresponds to the sound object can be output from the headphones of the HMD 20. The AR system 1 is configured as described above.
<Configuration Examples of the Respective Devices>

Next, configuration examples of the respective devices that constitute the AR system 1 of FIG. 1 will be described with reference to FIGS. 2 to 5.
(Detailed Configurations of the Control Box and the HMD)

Figure 2:
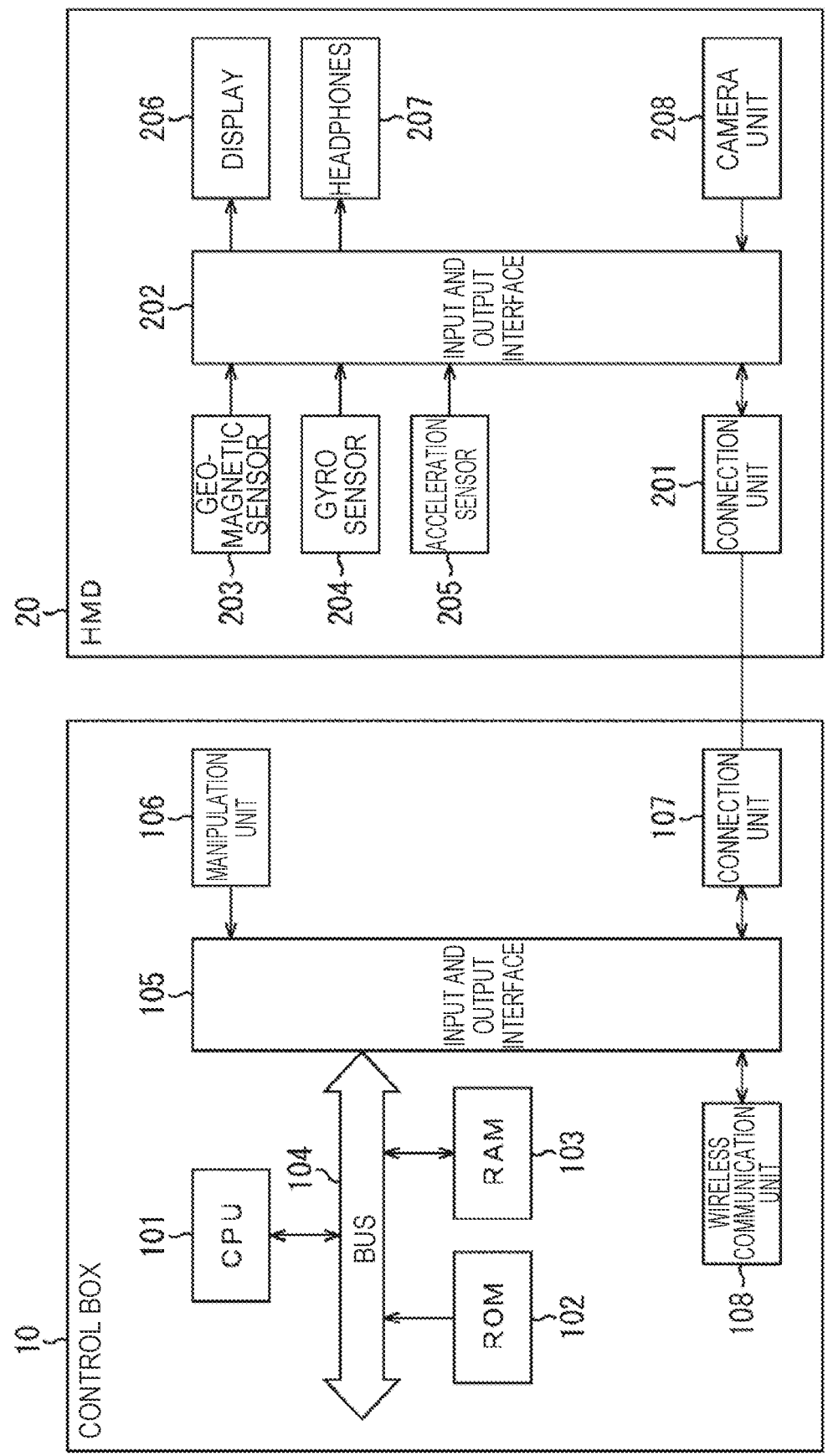
FIG. 2 is a block diagram showing a detailed configuration of a control box and a HMD.

FIG. 2 is a block diagram showing the detailed configurations of the control box 10 and the HMD 20 of FIG. 1. As described above, the control box 10 and the HMD 20 are connected to each other by the cable that conforms to the predetermined standard.

As shown in FIG. 2, a central processing unit (CPU) 101, a read only memory (ROM) 102, and a random access memory (RAM) 103 are connected to each other by a bus 104 in the control box 10. The CPU 101 executes a control program recorded in the ROM 102 to control operations of each unit of the control box 10. In addition, the RAM 103 includes various kinds of data appropriately recorded therein.

An input and output interface 105 is further connected to the bus 104. The input and output interface 105 is connected to a manipulation unit 106, a connection unit 107, and a wireless communication unit 108. The manipulation unit 106 is a physical button and the like provided in the control box 10, and supplies manipulation signals to the CPU 101 according to manipulations of the user. The CPU 101 controls operations of each unit of the HMD 20 according to the manipulation signals from the manipulation unit 106.

The connection unit 107 is connected to the HMD 20 by the cable that conforms to the predetermined standard, and performs an exchange of various kinds of data with the HMD 20 according to control of the CPU 101. The wireless communication unit 108 has a short-range wireless communication function, performs wireless communication with the smartphone 30 according to control of the CPU 101 based on a predetermined short-range wireless communication standard to exchange various kinds of data.

In addition, as shown in FIG. 2, the HMD 20 is constituted by a connection unit 201, a geo-magnetic sensor 203, a gyro sensor 204, an acceleration sensor 205, a display 206, headphones 207, and a camera unit 208, and the constituent elements are connected to an input and output interface 202.

The geo-magnetic sensor 203 detects geomagnetism around the HMD 20. The gyro sensor 204 detects rotation angles of the HMD 20. The acceleration sensor 205 detects gravitational acceleration of the HMD 20. Detection results from the geo-magnetic sensor 203, the gyro sensor 204, and the acceleration sensor 205 are supplied to the connection unit 201 via the input and output interface 202 as sensor values.

The connection unit 201 outputs the sensor values from the geo-magnetic sensor 203, the gyro sensor 204, and the acceleration sensor 205 to the control box 10. Accordingly, the control box 10 can detect an attitude or a direction of the HMD 20 using the sensor values. Note that the control box 10 may acquire a current position of the user using the sensor values rather than using the GPS function based on so-called autonomous navigation.

The display 206 includes the pair of transmissive-type displays for the left eye and the right eye described above. The display 206 displays various images according to control of the control box 10. In addition, the headphones 207 are small headphones placed at positions close to the left and right ears of the user. The headphones 207 output various sounds according to control of the control box 10.

The camera unit 208 is an outward-facing camera configured with a solid-state image sensor such as a complementary metal oxide semiconductor (CMOS) image sensor, and has a function of photographing subjects viewed through the display 206. The camera unit 208 supplies image data obtained by photographing a subject and performing predetermined image processing to the connection unit 201. The connection unit 201 outputs the image data from the camera unit 208 to the control box 10. Accordingly, the control box 10 can perform various kinds of processing on the image data.
(Detailed Configuration of the Smartphone)

Figure 3:
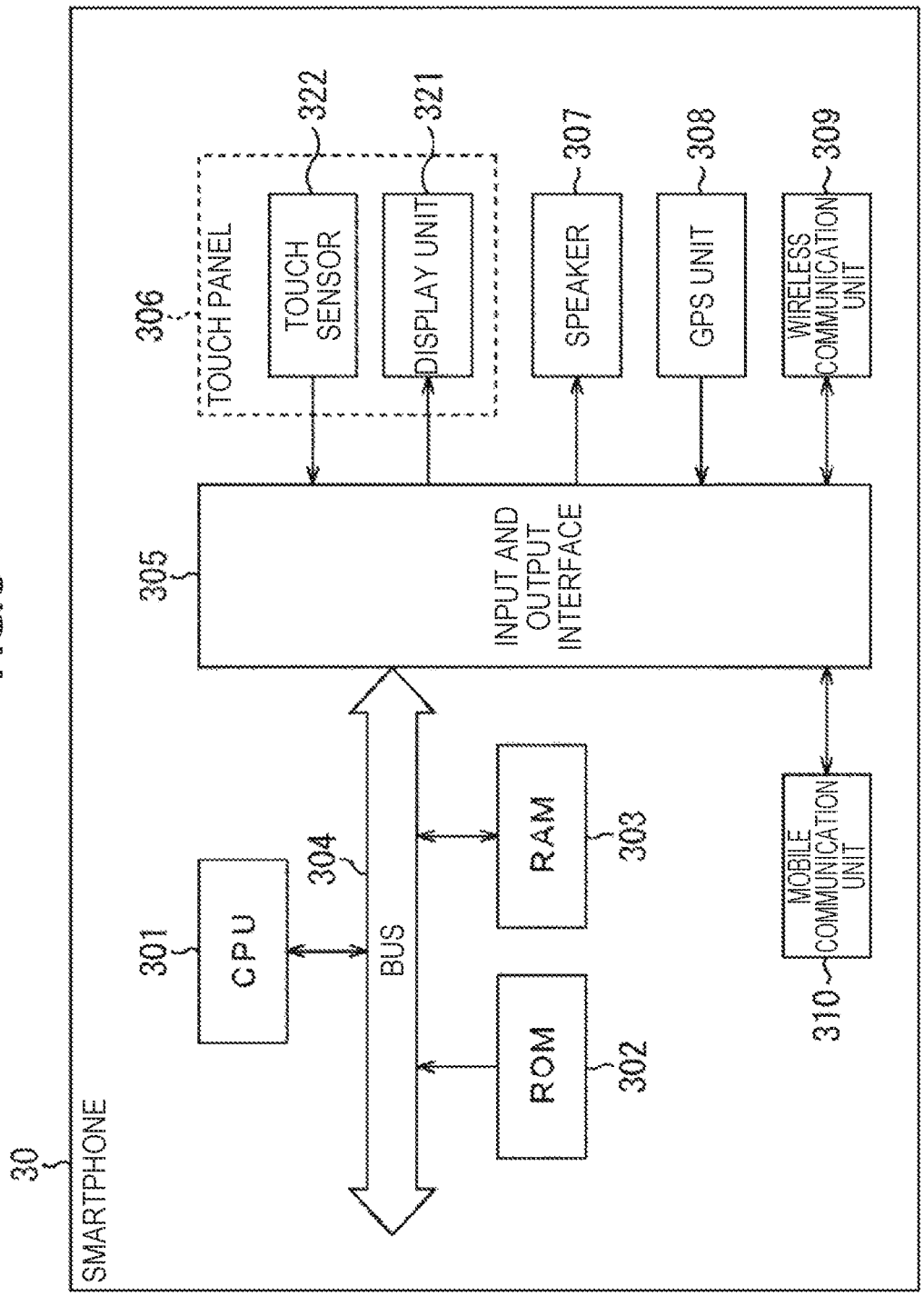
FIG. 3 is a block diagram showing a detailed configuration of a smartphone.

FIG. 3 is a block diagram showing a detailed configuration of the smartphone 30 of FIG. 1.

As shown in FIG. 3, a CPU 301, a ROM 302, and a RAM 303 are connected to each other by a bus 304 in the smartphone 30. The CPU 301 executes a control program recorded in the ROM 302 to control various operations of the smartphone 30. In addition, the RAM 303 has various kinds of data appropriately recorded therein.

An input and output interface 305 is further connected to the bus 304. A touch panel 306, a speaker 307, a GPS unit 308, a wireless communication unit 309, and a mobile communication unit 310 are connected to the input and output interface 305.

The touch panel 306 is constituted by a display unit 321 and a touch sensor 322 that is overlaid on the screen of the display unit. The display unit 321 is configured by a liquid crystal display (LCD) or the like, and displays various kinds of information according to control of the CPU 301. In addition, the touch sensor 322 detects an input manipulation performed by the user on the touch panel 306 along with the position on the touch panel 306 at which the manipulation is performed, and supplies a detection signal to the CPU 301. The CPU 301 controls operations of the units of the smartphone 30 according to the detection signal from the touch sensor 322.

The speaker 307 outputs sounds corresponding to sound signals according to control of the CPU 301. In addition, the GPS unit 308 acquires current positions of the user by receiving signals from the GPS satellite 90 via an antenna according to control of the CPU 301.

The wireless communication unit 309 has a short-range wireless communication function, and thus performs wireless communication that conforms to a predetermined short-range wireless communication standard with the control box 10 according to control of the CPU 301 to exchange various kinds of data. In addition, the mobile communication unit 310 performs communication with the AR server 40 and the like via the Internet 80 according to control of the CPU 301 to exchange various kinds of data. Note that, although details are not illustrated, the smartphone 30 has other functions such as a calling function like a mobile telephone.
(Detailed Configuration of the AR Server)

Figure 4:
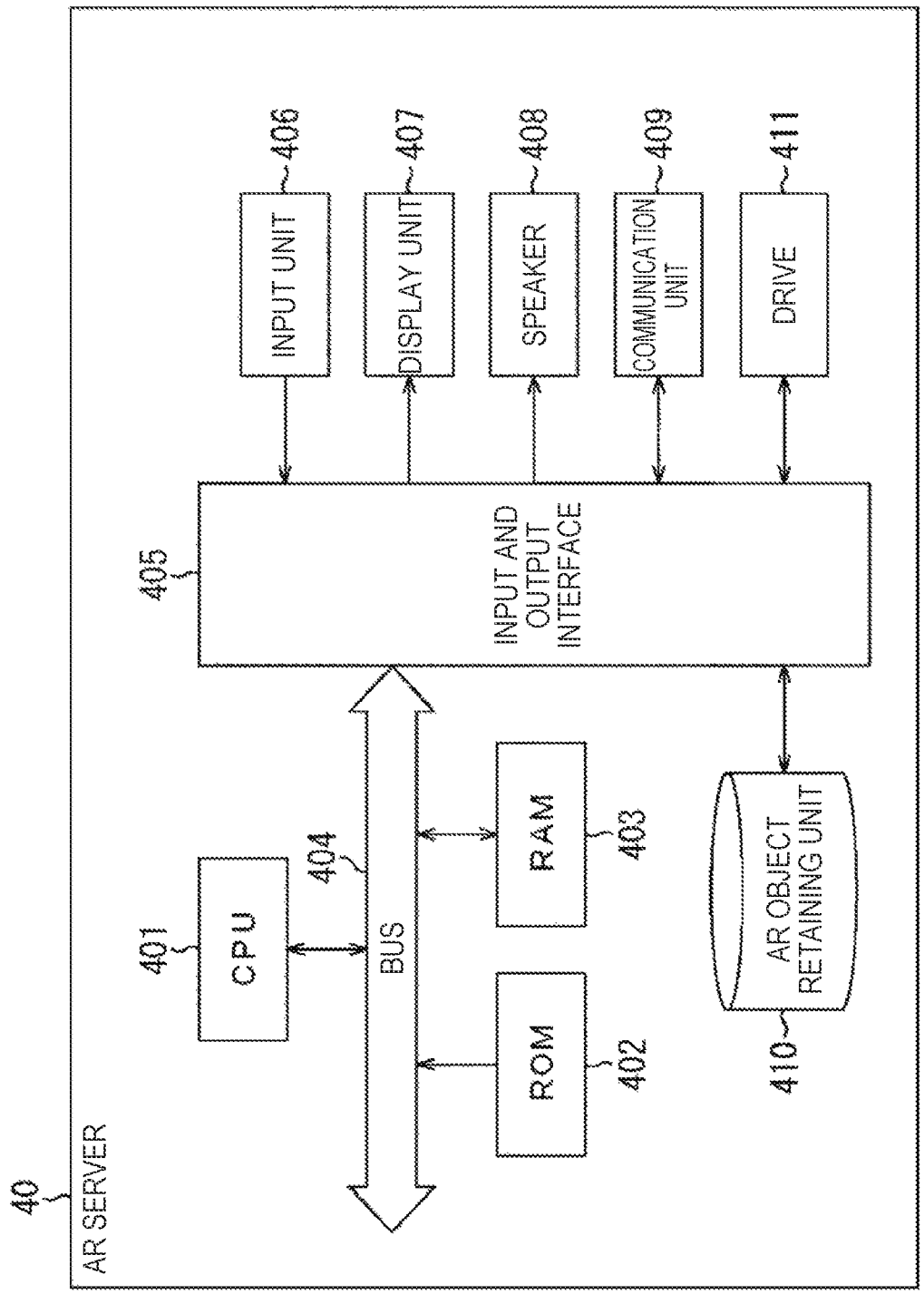
FIG. 4 is a block diagram showing a detailed configuration of an AR server.

FIG. 4 is a block diagram showing a detailed configuration of the AR server 40 of FIG. 1.

As shown in FIG. 4, a CPU 401, a ROM 402, and a RAM 403 are connected to each other by a bus 404 in the AR server 40. The CPU 401 executes a control program recorded in the ROM 402 to control various operations of the units of the AR server 40. In addition, the RAM 403 has various kinds of data appropriately recorded therein.

An input and output interface 405 is further connected to the bus 404. An input unit 406, a display unit 407, a speaker 408, a communication unit 409, an AR object retaining unit 410, and a drive 411 are connected to the input and output interface 405.

The input unit 406 includes a keyboard, a mouse, a microphone, and the like, and supplies input information to the CPU 401. The display unit 407 is configured by a liquid crystal display or the like, and displays various kinds of information according to control of the CPU 401. In addition, the speaker 408 outputs sounds according to control of the CPU 401. The communication unit 409 performs communication with the smartphone 30 via the Internet 80 according to control of the CPU 401 to exchange various kinds of data.

The AR object retaining unit 410 retains AR object information. The AR object information is, for example, prepared in advance as data to be overlaid on an object of a real space, and recorded in the AR object retaining unit 410. The AR object retaining unit 410 supplies the AR object information to the communication unit 409 according to control of the CPU 401. The communication unit 409 transmits the AR object information read from the AR object retaining unit 410 to the smartphone 30 via the Internet 80.

The drive 411 is for appropriately loading a removable medium such as a magnetic disk, an optical disc, a magneto-optical disc, or a semiconductor memory to drive the removable medium according to control of the CPU 401.
(Detailed Configuration of an AR Processing Unit)

Figure 5:
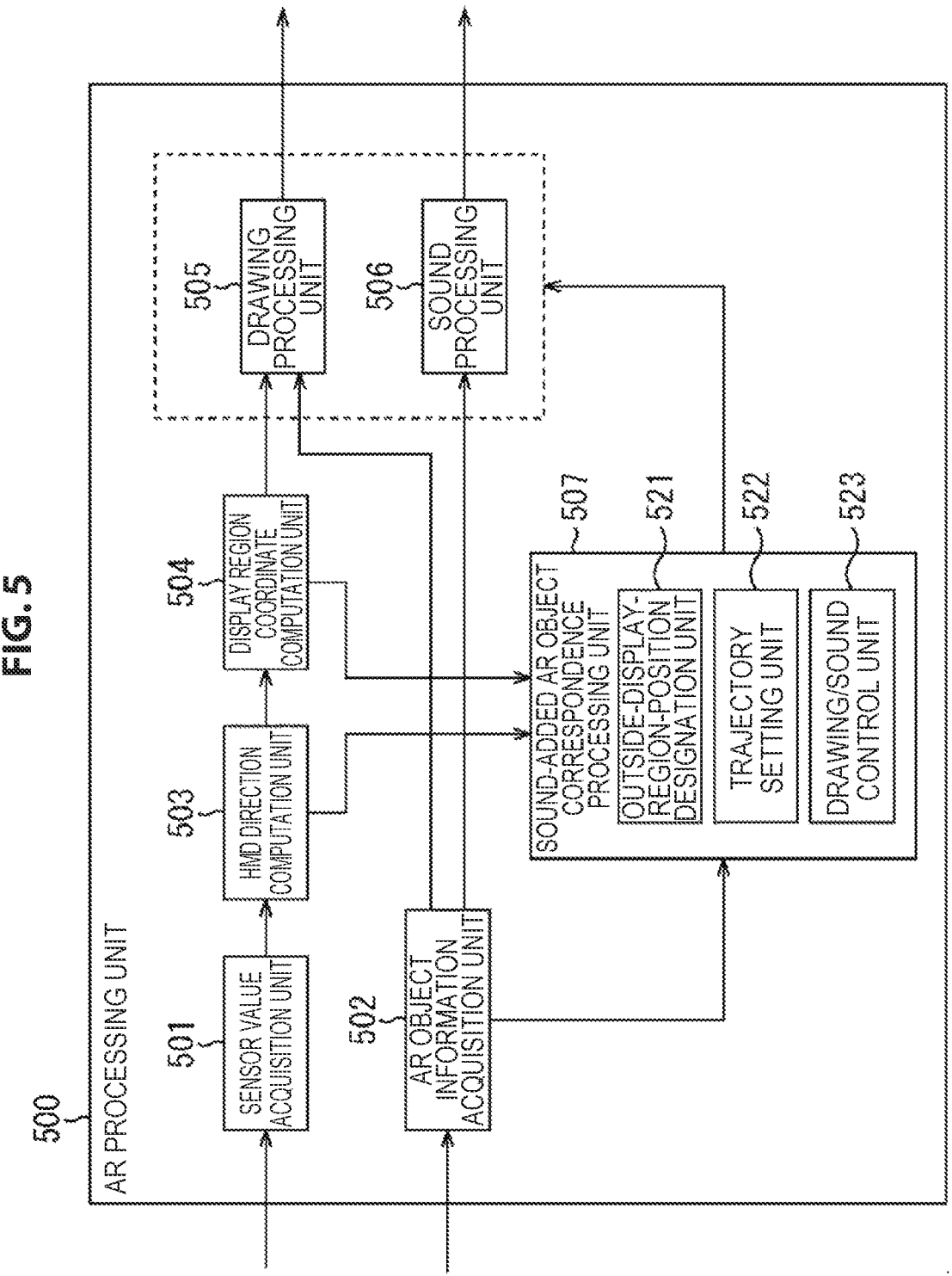
FIG. 5 is a block diagram showing a detailed configuration of an AR processing unit.

FIG. 5 is a diagram showing a detailed configuration of an AR processing unit 500. The AR processing unit 500 is realized as software when, for example, the CPU 101 of the control box 10 executes the control program. The function of the AR processing unit 500, however, may be realized by another electronic apparatus such as the HMD 20. In addition, the function of the AR processing unit 500 may be realized by, for example, an electronic apparatus with integrated functions of the control box 10, the HMD 20, and even the smartphone 30.

As shown in FIG. 5, the AR processing unit 500 includes a sensor value acquisition unit 501, an AR object information acquisition unit 502, an HMD direction computation unit 503, a display region coordinate computation unit 504, a drawing processing unit 505, a sound processing unit 506, and a sound-added AR object correspondence processing unit 507.

The sensor value acquisition unit 501 acquires sensor values detected by the geo-magnetic sensor 203, the gyro sensor 204, and the acceleration sensor 205 of the HMD 20, and supplies the values to the HMD direction computation unit 503. In addition, the AR object information acquisition unit 502 acquires AR object information of a current position received from the AR server 40 and supplies information included in the AR object information to each of the drawing processing unit 505, the sound processing unit 506, and the sound-added AR object correspondence processing unit 507. Specifically, coordinate information out of the information included in the AR object information is supplied to the drawing processing unit 505 and the sound-added AR object correspondence processing unit 507, an image object is supplied to the drawing processing unit 505 and the sound-added AR object correspondence processing unit 507, a sound object is supplied to the sound processing unit 506 and the sound-added AR object correspondence processing unit 507, and a sound object image is supplied to the sound-added AR object correspondence processing unit 507.

The HMD direction computation unit 503 computes a direction of the HMD 20 worn on the head of the user based on the sensor values supplied from the sensor value acquisition unit 501, and supplies the direction to the display region coordinate computation unit 504 and the sound-added AR object correspondence processing unit 507.

The display region coordinate computation unit 504 computes the coordinates of a display region (which will also be referred to as a "display region A" hereinafter) of the display 206 of the HMD 20 based on information indicating the direction of the HMD 20 supplied from the HMD direction computation unit 503, and supplies the computation result to the drawing processing unit 505 and the sound-added AR object correspondence processing unit 507 as display region information.

The drawing processing unit 505 receives the supply of the display region information from the display region coordinate computation unit 504, the coordinate information, and the image object from the AR object information acquisition unit 502. The drawing processing unit 505 causes the image object to be displayed on the display 206 of the HMD 20 based on the display region information and the coordinate information. In addition, the drawing processing unit 505 causes the sound object image to be displayed on the display 206 of the HMD 20 according to control of the sound-added AR object correspondence processing unit 507.

The sound processing unit 506 causes a sound corresponding to a sound signal of the sound object supplied from the AR object information acquisition unit 502 to be output from the headphones 207 of the HMD 20 according to control of the sound-added AR object correspondence processing unit 507.

The sound-added AR object correspondence processing unit 507 performs processing for a sound-added AR object. The sound-added AR object correspondence processing unit 507 is constituted by an outside-display-region-position designation unit 521, a trajectory setting unit 522, and a drawing/sound control unit 523.

The outside-display-region-position designation unit 521 designates a position of a place desired to be indicated (hereinafter referred to as a "target T") outside the display region A based on the display region information supplied from the display region coordinate computation unit 504. For example, when an AR object present outside the display region A is set as the target T, the coordinate information of the image object is designated as the position of the target T. The target T, however, is not limited to an AR object, and it may be any object, for example, an object present in a real space whose position can be designated.

The trajectory setting unit 522 sets a trajectory of the sound object supplied from the AR object information acquisition unit 502. However, the trajectory setting unit 522 sets a trajectory that passes through the display region A at least once as the trajectory of the sound object.

The drawing/sound control unit 523 controls the drawing processing unit 505 according to the trajectory set by the trajectory setting unit 522 to display a sound object image on the display 206 of the HMD 20. In addition, the drawing/sound control unit 523 controls the sound processing unit 506 according to information such as the trajectory set by the trajectory setting unit 522 to output a sound corresponding to the sound signal of the sound object from the headphones 207 of the HMD 20.

In addition, the drawing/sound control unit 523 controls the sound processing unit 506 based on the information indicating the direction of the HMD 20 supplied from the HMD direction computation unit 503 to match the height of the AR object (the sound object) with the central height of the display region of the display 20 of the HMD 20.

<Details of a Specific Process Executed by Respective Devices>

Figure 6:
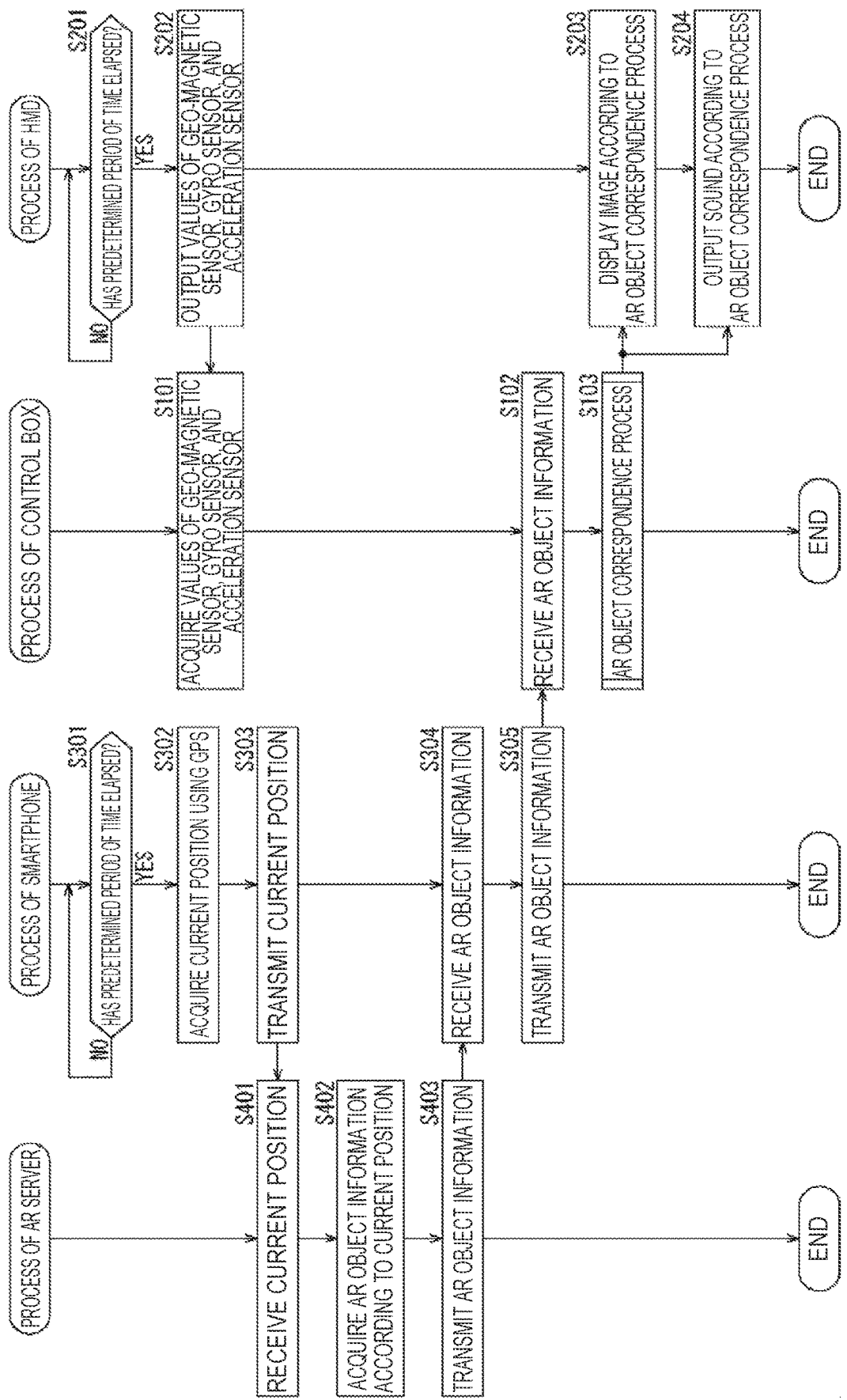
FIG. 6 is a flowchart describing a process executed by each of devices constituting an AR system.

First, a process executed by the respective devices constituting the AR system 1 and the flow of information according to the processes will be described with reference to the flowchart of FIG. 6. In the flowchart of FIG. 6, however, processes from Steps S101 to S103 are executed by the control box 101, processes from Steps S201 to S204 are executed by the HMD 20. In addition, processes from Steps S301 to S305 are executed by the smartphone 30, and processes from Step S401 to S403 are executed by the AR server 40.

As shown in FIG. 6, the HMD 20 determines whether a predetermined interval time, which is a timing at which each sensor performs sensing, has elapsed (S201), and when the predetermined interval time has elapsed, the process proceeds to Step S202. Then, since the geo-magnetic sensor 203, the gyro sensor 204, and the acceleration sensor 205 perform the sensing, the connection unit 201 outputs the detection result of the sensors to the control box 10 as sensor values (S202). Note that the HMD 20 performs a process of acquiring the sensor values, for example, 30 times per second.

In the control box 10, the sensor value acquisition unit 501 controls the connection unit 107 to acquire the sensor values output from the HMD 20 (S101).

In addition, the smartphone 30 determines whether a predetermined interval time, which is a timing at which the GPS satellite 90 acquires a current position, has elapsed (S301), and when the predetermined interval time has elapsed, the process proceeds to Step S302 as shown in FIG. 6. Then, the GPS unit 308 receives a signal from the GPS satellite 90 via an antenna according to control of the CPU 301 to acquire the current position of the user (S302). The mobile communication unit 310 transmits information indicating the current position of the user to the AR server 40 via the Internet 80 according to control of the CPU 301 (S303).

In the AR server 40, the communication unit 409 acquires the information indicating the current position transmitted from the smartphone 30 via the Internet 80 according to control of the CPU 401 when the information indicating the current position is transmitted from the smartphone 30 (S401). Then, the CPU 401 acquires AR object information corresponding to the information indicating the current position acquired by the communication unit 409 from the AR object retaining unit 410 (S402). The communication unit 409 transmits the AR object information corresponding to the information indicating the current position to the smartphone 30 that is a request source via the Internet 80 according to control of the CPU 401 (S403).

In the smartphone 30, the mobile communication unit 310 receives the AR object information transmitted from the AR server 40 via the Internet 80 according to control of the CPU 301 (S304). In addition, the wireless communication unit 309 performs wireless communication with the control box 10 based on a predetermined short-range wireless communication standard according to control of the CPU 301 to transmit the AR object information (S305). Note that the smartphone 30 performs a process of acquiring the AR object information corresponding to the current position, for example, once every 10 seconds.

In the control box 10, the AR object information acquisition unit 502 controls the wireless communication unit 108 to perform wireless communication with the smartphone 30 based on the predetermined short-range wireless communication standard, and thereby receives the AR object information (S102). Then, the AR processing unit 500 performs an AR object correspondence process (S103) according to the AR object information based on the sensor values acquired from the HMD 20 and the current position of the user provided from the AR server 40. In the AR object correspondence process, an image object of an AR object inside the display region A of the display 206 of the HMD 20 is displayed, and an AR object outside the display region A is indicated by a sound object. Details of the AR object correspondence process will be described below with reference to the flowcharts of FIGS. 7 and 19.

Then, by performing the AR object correspondence process, an image corresponding to the AR object correspondence process is displayed on the display 206 of the HMD 20 (S203), and a sound corresponding to the AR object correspondence process is output from the headphones 207 of the HMD 20 (S204).

The process executed by the respective devices constituting the AR system 1 and the flow of the information according to the processes have been described above.

(AR Object Correspondence Process 1)

Next, the AR object correspondence process 1 that corresponds to Step S103 of FIG. 6 executed by the AR processing unit 500 will be described with reference to the flowchart of FIG. 7.

In Step S501, the HMD direction computation unit 503 computes the direction of the HMD 20 based on the sensor values from the sensor value acquisition unit 501, and supplies the direction to the display region coordinate computation unit 504.

In Step S502, the display region coordinate computation unit 504 computes the coordinates of the display region A of the display 206 of the HMD 20 based on the information indicating the direction of the HMD 20 from the HMD direction computation unit 503, and supplies the computation result to the drawing processing unit 505 and the sound-added AR object correspondence processing unit 507 as display region information.

In Step S503, the drawing processing unit 505 determines whether there is an overlapping part between the display region A of the display 206 and a target image object (an AR object) based on the coordinate information of the image object from the AR object information acquisition unit 502 and the display region information from the display region coordinate computation unit 504. If it is determined that there is an overlapping part in Step S503, the process proceeds to Step S504, In Step S504, the drawing processing unit 505 draws an image object of the overlapping part in the display region A of the display 206 according to the determination result of Step S503. Here, a detailed procedure of the drawing process of the image object (the AR object) will be described with reference to FIGS. 8 and 9.

Figure 7:
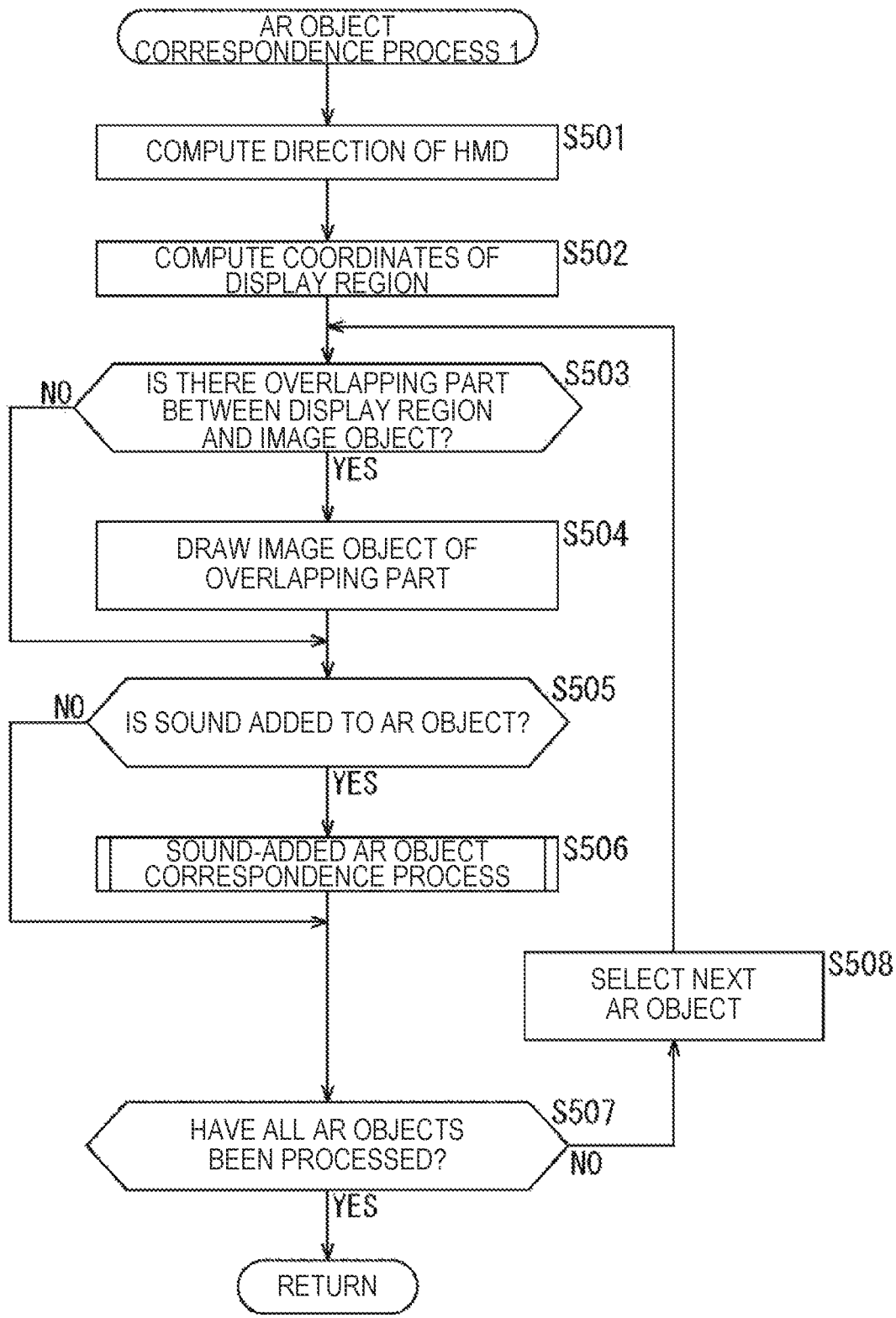
FIG. 7 is a flowchart describing an AR object correspondence process 1.
Figure 8:
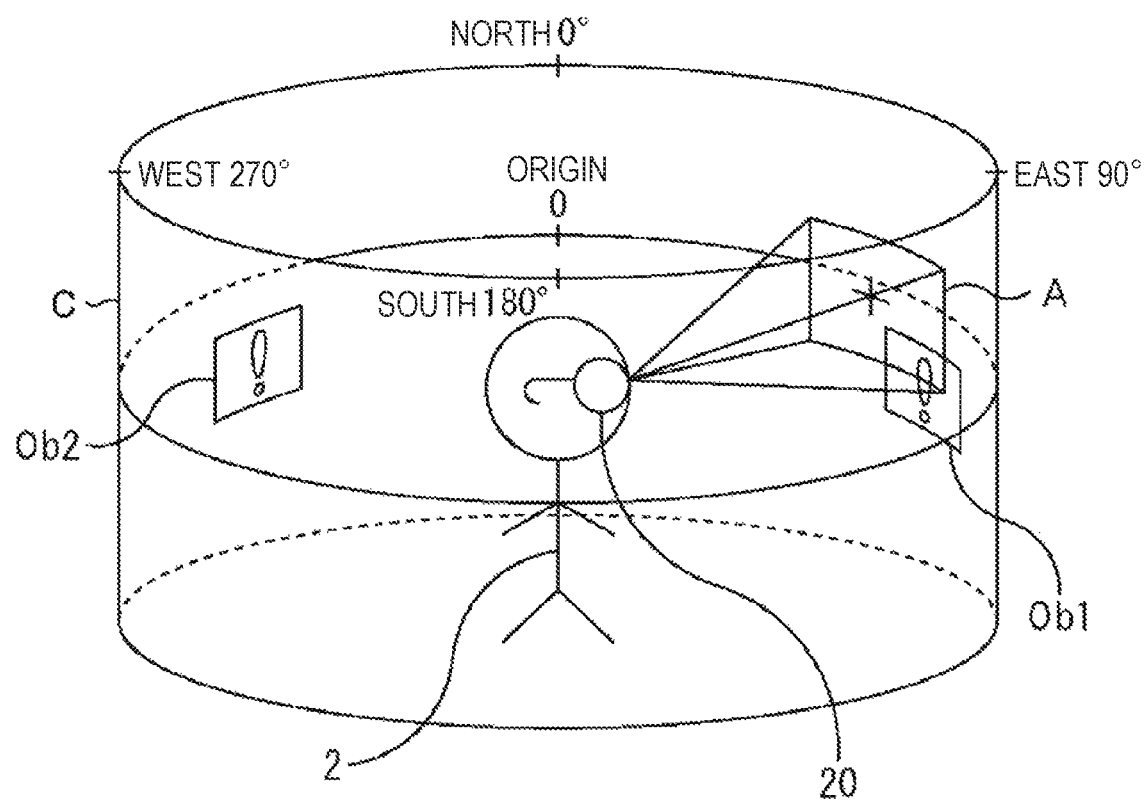
FIG. 8 is a diagram showing a cylindrical coordinate system of the AR system.
Figure 9:
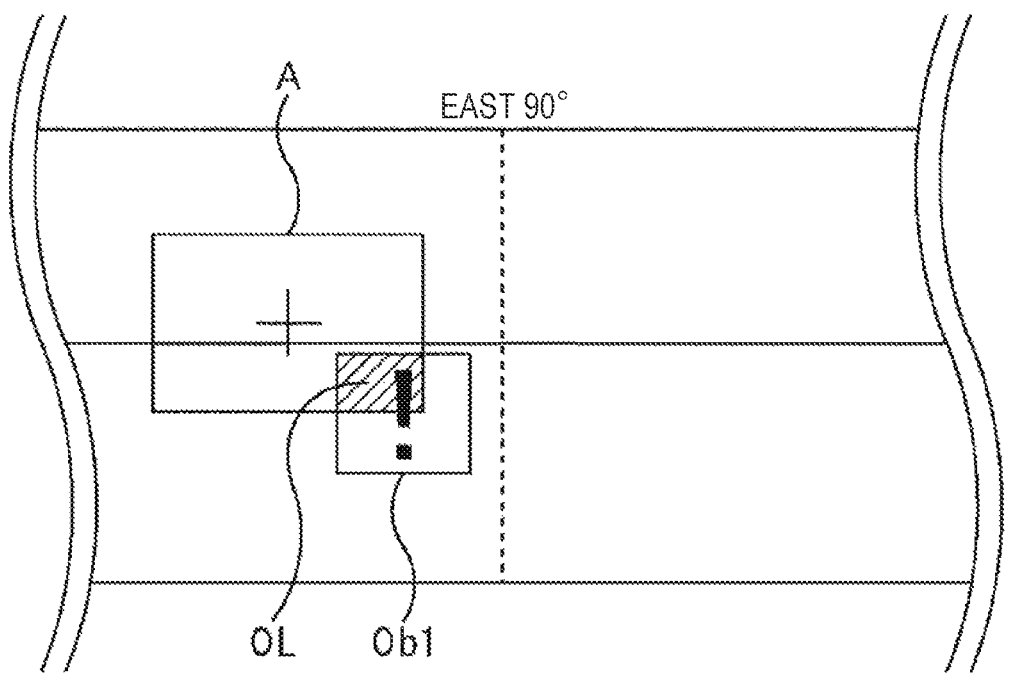
FIG. 9 is a diagram showing a relation between a display region and an AR object in the cylindrical coordinate system.

As shown in FIG. 8, when an image object (an AR object) is to be presented to a user 2 who is wearing the HMD 20, a cylindrical coordinate system C is defined around the user 2 serving as the center thereof, and positions of the display region A and an image object Ob are decided on the cylindrical coordinate system C. In other words, the display region A in accordance with the direction of the HMD 20 and image objects Ob1 and Ob2 in accordance with the current position of the user are disposed in the cylindrical coordinate system C of FIG. 8. In addition, as shown in FIG. 9, the display region A and the image object Ob1 overlap each other in an overlap OL. Thus, in the drawing process of the image object of Step S504 of FIG. 7, the overlap OL of the image object Ob1 is drawn in the display region A of the display 206.

Returning to the flowchart of FIG. 7, if it is determined that there is no overlapping part in Step S503, the process of Step S504 is skipped, and the process proceeds to Step S505. For example, since the image object Ob2 of FIG. 8 is outside the display region A, it is not a target of the drawing process of Step S504.

In Step S505, it is determined whether a sound is added to the target AR object. If a sound is determined to be added to the target AR object, in other words, if the object is determined to be a sound-added AR object in Step S505, the process proceeds to Step S506.

In Step S506, the sound-added AR object correspondence processing unit 507 performs the sound-added AR object correspondence process based on the AR object information acquired by the AR object information acquisition unit 502 and the coordinates of the display region computed by the display region coordinate computation unit 504. In the sound-added AR object correspondence process, a process for indicating the position of the target T outside the display region A to the user 2 who is wearing the HMD 20 is performed.

Figure 10:
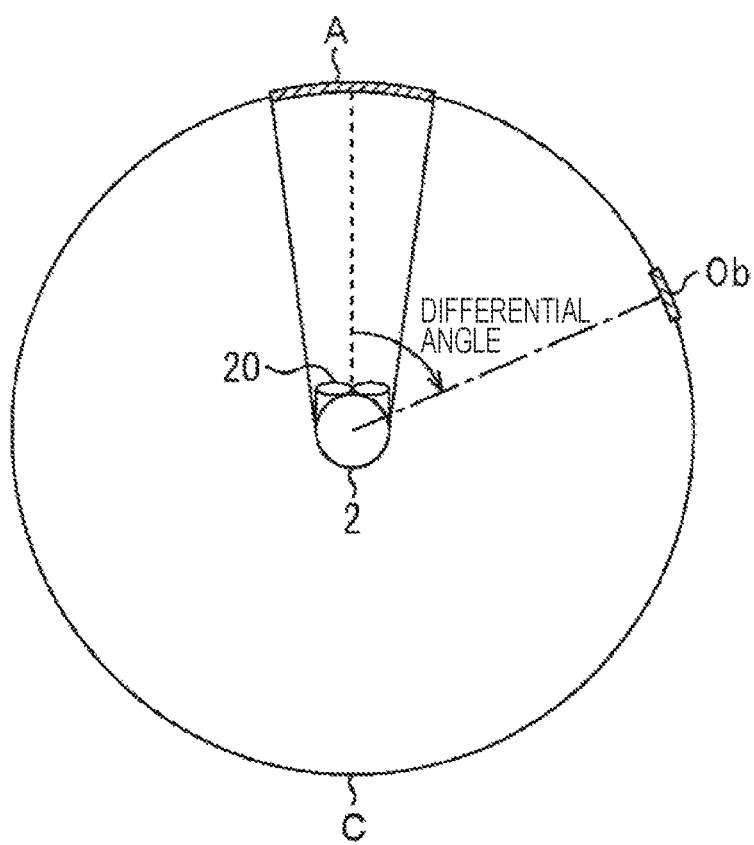
FIG. 10 is a diagram showing a relation between a display region and a sound-added AR object in the cylindrical coordinate system.

In other words, when the cylindrical coordinate system C of FIG. 8 is viewed from above as shown in FIG. 10, for example, and when there is no AR object overlapping the display region A and only a sound-added AR object Ob is present outside the display region A, a differential angle formed between the direction of a line of sight (a front direction) of the user wearing the HMD 20 and the direction of the sound-added AR object Ob is computed as object direction information. Then, using this object direction information, the output of a sound is controlled so that the sound of the sound object is heard from the direction indicating the sound-added AR object Ob (the target T), and thereby the position of the sound-added AR object Ob (the target T) outside the display region A is indicated. Details of the sound-added AR object correspondence process will be described with reference to the flowcharts of FIGS. 11 and 15.

Returning to the flowchart of FIG. 7, when the target AR object is determined not to have a sound added thereto in Step S505, the process of Step S506 is skipped, and the process proceeds to Step S507. In Step S507, it is determined whether all AR objects acquired by the AR object information acquisition unit 502 have been processed. If it is determined that all of the AR objects have not been processed in Step S507, the process proceeds to Step S508.

In Step S508, one AR object that has not yet undergone the process is selected as the next target AR object. In addition, when the processes of Steps S503 to S506 described above are repeated and then an image object of the selected target AR object is on the display region A, an overlapping part thereof is drawn (S504), and when the further selected AR object is a sound-added AR object, a sound-added AR object correspondence process is executed (S506).

When the processes are executed sequentially on one or a plurality of AR objects acquired by the AR object information acquisition unit 502 as described above and it is determined that all of the AR objects have been processed in Step S507, the AR object correspondence process 1 of FIG. 7 ends. The process thereafter returns to Step S103 of FIG. 6, and the succeeding processes are executed.

The AR object correspondence process 1 has been described above. As the sound-added AR object correspondence process is performed in the AR object correspondence process 1, a position outside the display region A of the display 206 of the HMD 20 (for example, a position of the target T such as a sound-added AR object) is designated, and the output of a sound of a sound object is controlled while the sound-added AR object moves toward the designated position. As a result, the position outside the display region A can be more exactly indicated, and thus the user can be aware of the position.

Note that, with respect to the AR object correspondence process 1 of FIG. 7, the process is performed, for example, 30 times per second for one AR object.

(Sound-added AR Object Correspondence Process 1)

Next, the sound-added AR object correspondence process 1 that corresponds to Step S506 of FIG. 7 executed by the sound-added AR object correspondence processing unit 507 will be described with reference to the flowchart of FIG. 11.

In Step S521, the outside-display-region-position designation unit 521 determines whether there is a target T desired to be indicated outside of the display region A. When it is determined that there is a target T desired to be indicated outside of the display region A in Step S521, the process proceeds to Step S522.

Figure 12:
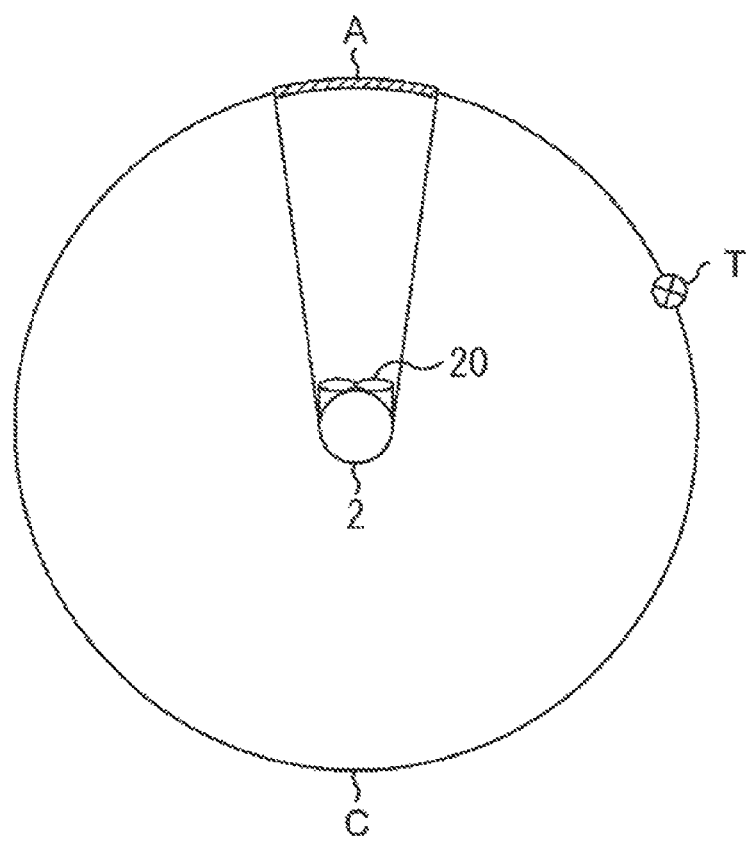
FIG. 12 is a diagram showing an example of a designation of a position of a target.

In Step S522, the outside-display-region-position designation unit 521 designates the position of the target T outside the display region A. For example, the position of the target T (for example, a sound-added AR object or the like) outside the display region A in the cylindrical coordinate system C is designated as shown in FIG. 12.

Figure 11:
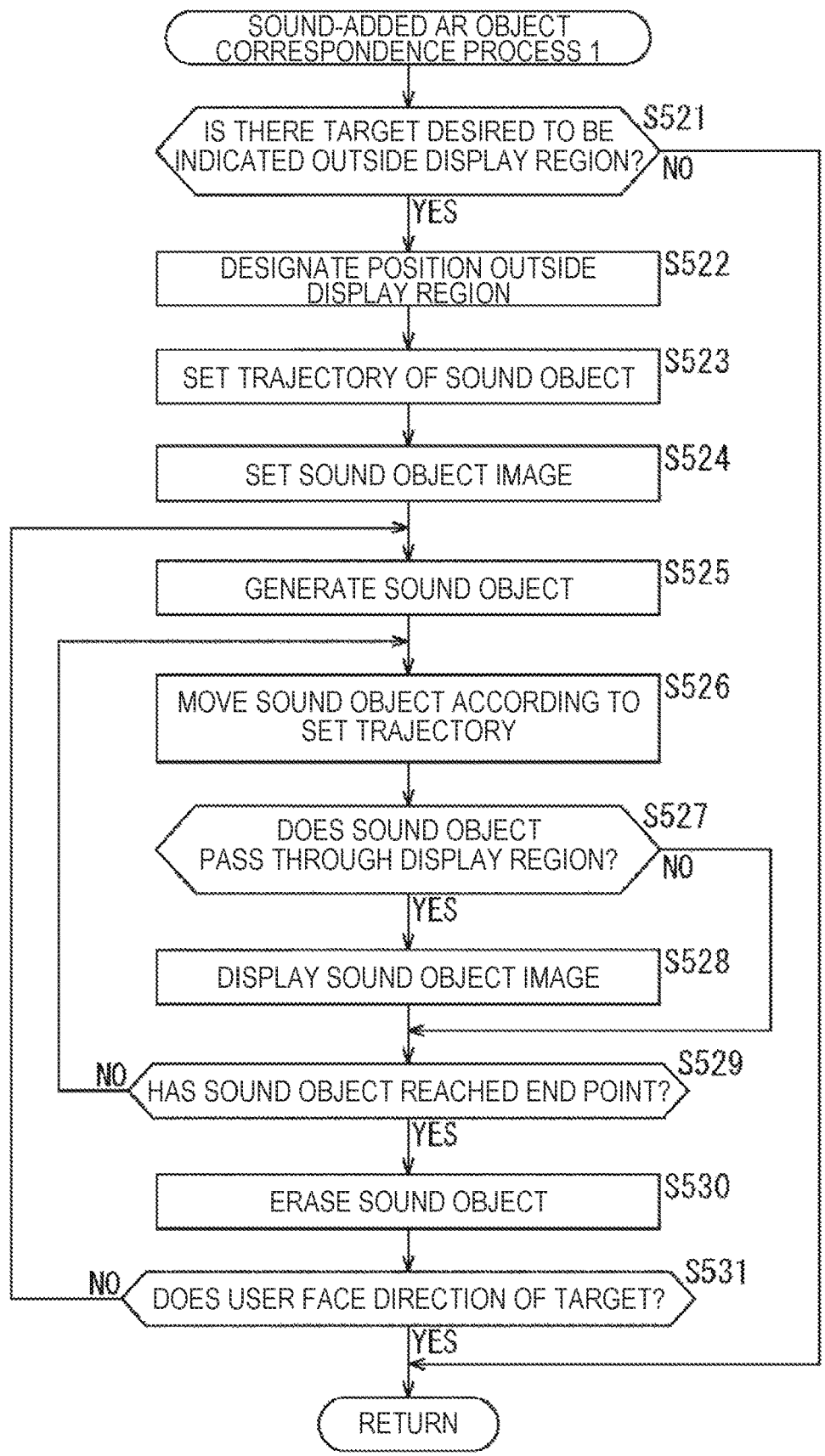
FIG. 11 is a flowchart describing a sound-added AR object correspondence process 1.
Figure 13:
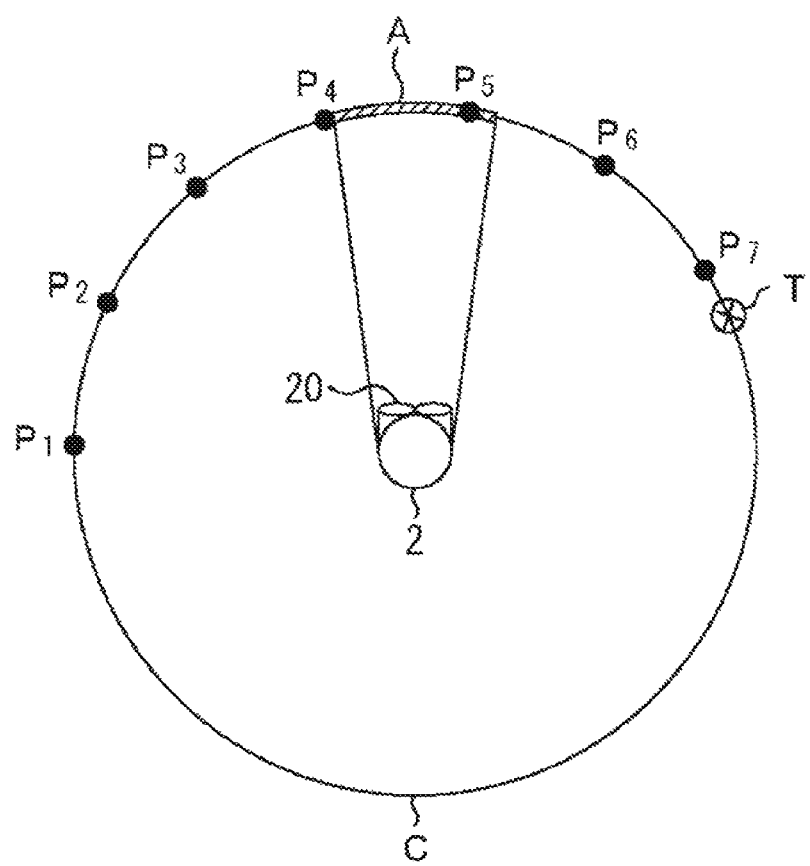
FIG. 13 is a diagram showing an example of setting a trajectory of a sound-added AR object.

Returning to the flowchart of FIG. 11, the trajectory setting unit 522 sets a trajectory of a sound object in Step S523. However, the trajectory of the sound object is desirably a trajectory that passes through the display region A at least once. For example, positions P1 to P7 in the cylindrical coordinate system C are set as the trajectory of the sound object as shown in FIG. 13. On the trajectory of FIG. 13, the sound object sequentially moves through the positions P1 to P7 in the cylindrical coordinate system C with respect to the user 2 who is at the center of the cylindrical coordinate system C. In FIG. 13, a part of the trajectory from the positions P4 to P6 passes through the display region A.

Returning to the flowchart of FIG. 11, the drawing/sound control unit 523 sets a sound object image in Step S524. The sound object image is an image displayed on the display region A when a sound object passes through the display region A, and an image that can facilitate identification of the target T is preferable. Thus, as the sound object image, for example, an arrow pointing at the target T or the like is possible. For the sound object image, however, a fixed image may be set as default, and in that case, the process of Step S524 is omitted.

In Step S525, the drawing/sound control unit 523 controls the sound processing unit 506 to generate a starting point in the cylindrical coordinate system C, i.e., a sound object at the position P1 on the trajectory of FIG. 13. After the sound object is generated, the process proceeds to Step S526. In Step S526, the drawing/sound control unit 523 controls the sound processing unit 506 according to the trajectory set by the trajectory setting unit 522 to move the sound object at a constant speed. In Step S527, the drawing/sound control unit 523 determines whether the sound object passes through the display region A. If the sound object is determined to pass through the display region A in Step S527, the process proceeds to Step S528.

In Step S528, the drawing/sound control unit 523 controls the drawing processing unit 505 to display the sound object image on the display 206 of the HMD 20. On the other hand, when the sound object is determined not to pass through the display region A in Step S527, the process of Step S528 is skipped, and the process proceeds to Step S529. In Step S529, the drawing/sound control unit 523 determines whether the sound object has reached an end point. When the sound object is determined to have not reached the end point in Step S529, the process returns to Step S526, and the succeeding processes are repeated.

In addition, as the processes from Steps S526 to S529 are repeated, the sound object starts the output of a sound from the position P1 that serves as the starting point on the trajectory of FIG. 13 and moves to the positions P2 to P7 in the cylindrical coordinate system C at a constant speed while continuing the output of the sound, and when it reaches the position P7, the sound object stops the output of the sound. Since a partial section (for example, the section from the position P4 to the position P5 or the like) on the entire trajectory is the display region A that the sound object passes through, a sound object image such as an arrow is displayed in the display region A of the display 206.

If the sound object is determined to have reached the end point, i.e., the position P7 in Step S529, the process proceeds to Step S530. In Step S530, the drawing/sound control unit 523 controls the sound processing unit 506 to erase the sound object that has reached the end point.

Figure 14:
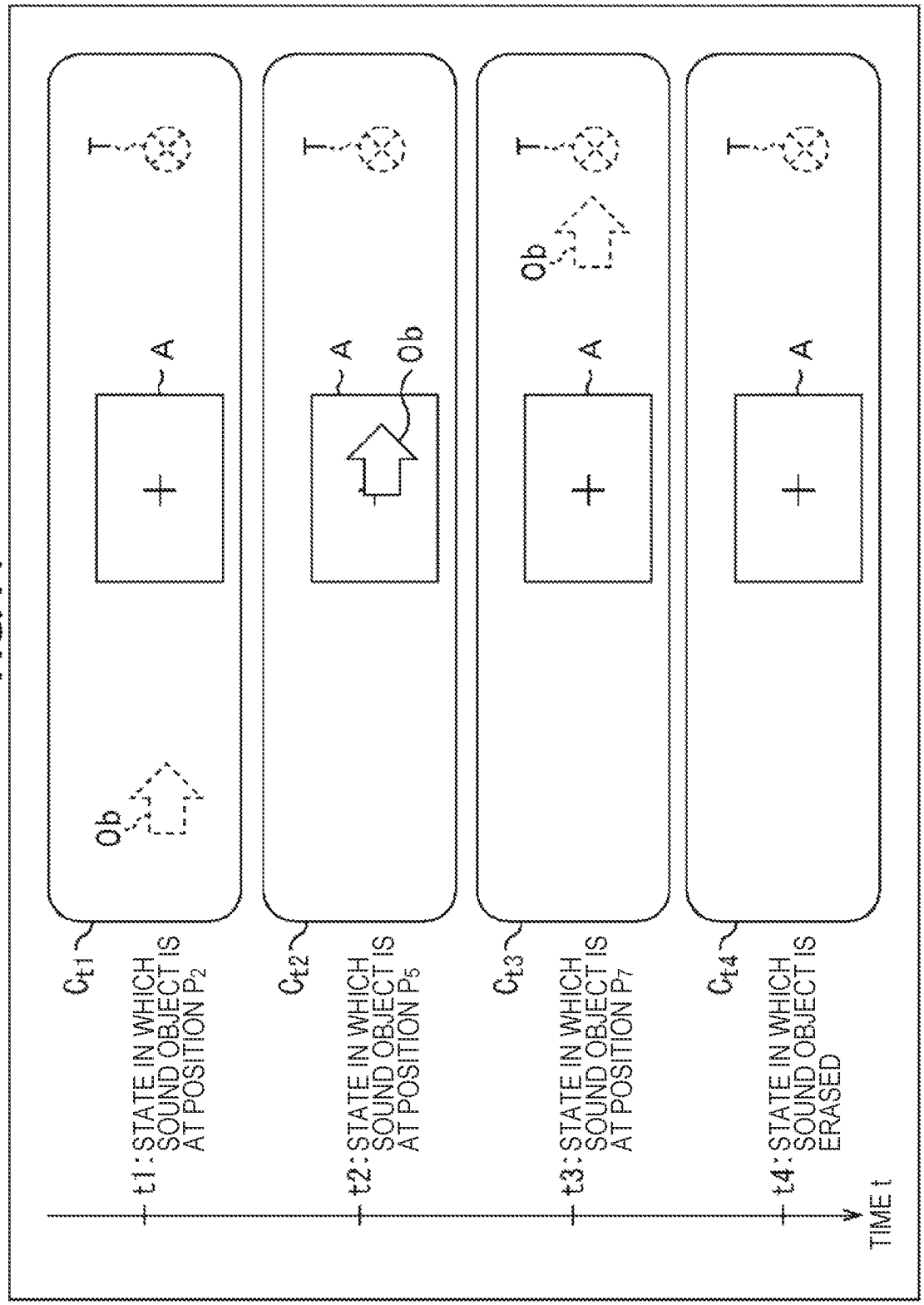
FIG. 14 is a diagram showing a display example of a sound object image.

Specifically, as shown in FIG. 14, when an up-down direction of the drawing is set to a time axis and the sound object is at the position P2 at a time t1, the sound object Ob is outside of the display region A as shown in a cylindrical coordinate system $C_{t1}$, and thus, only the output of the sound is performed and display of the sound object image is not performed. Then, when the sound object Ob moves to the position P5 at a time t2, the sound object Ob is positioned inside the display region A as shown in a cylindrical coordinate system $C_{t2}$, and thus the display of the sound object image is performed along with the output of the sound. Note that, in practice, the image of the sound object image like an arrow moving at a constant speed and traversing the display region A from left to right is displayed.

Accordingly, since the sound object image comes into the visual field of the user 2 and the movement speed of the sound object Ob can be seen, the user 2 can visually recognize the image of the arrow as well as the sound, and therefore can intuitively catch the presence of the target T on the right side of the display region A.

Then, when the sound object Ob moves to the position P7 at a time t3, the sound object Ob passes through the display region A and is positioned outside of the region as shown in a cylindrical coordinate system $C_{t3}$, and only the sound is output. Then, when the sound object Ob reaches the position P7, the sound object is erased and the output of the sound stops as shown in a cylindrical coordinate system $C_{t4}$ at a time t4.

Accordingly, after the user 2 recognizes the sound object image that is moving in the display region A at the constant speed, the user perceives the time taken from when the sound object image leaves the visual field to when the sound is erased, and thereby, the user can intuitively perceive how far on the right side the position of the target T is from the direction that the user is facing.

Returning to the flowchart of FIG. 11, it is determined whether the user 2 is facing the direction of the position of the target T in Step S531. Here, using the sensor values of the various sensors provided in the HMD 20, for example, the direction of the face of the user 2 after the sound object reaches the position P7 and is erased is computed, and whether the user 2 is facing the direction of the position of the target T is determined. If the user 2 is determined not to be facing the direction of the position of the target T in Step S531, the process returns to Step S525.

Then, by repeating the processes of Steps S525 to S531, the process for indicating the position of the target T outside of the display region A is performed again using the sound of the sound object and the sound object image, and if the user 2 is determined to be facing the direction of the position of the target T, the sound-added AR object correspondence process 1 of FIG. 11 ends. In addition, when it is determined that there is no target T desired to be indicated outside of the display region A in Step S521, the sound-added AR object correspondence process 1 of FIG. 11 ends. Then, the process returns to Step S506 of FIG. 7, and the succeeding processes are repeated.

The sound-added AR object correspondence process 1 has been described above. In the sound-added AR object correspondence process 1, in the case in which, while a sound-added AR object moves to a designated position (for example, the position of the target T such as the sound-added AR object), the output of the sound of the sound object is controlled, and when the sound object passes through the display region A, the sound object image thereof is displayed in the display region A. As a result, the sound and the image more exactly indicate a position thereof outside of the display region A, and thus the user can be aware of the position.

(Sound-added AR Object Correspondence Process 2)

Next, the sound-added AR object correspondence process 2 that corresponds to Step S506 of FIG. 7 executed by the sound-added AR object correspondence processing unit 507 will be described with reference to the flowchart of FIG. 15.

Figure 16:
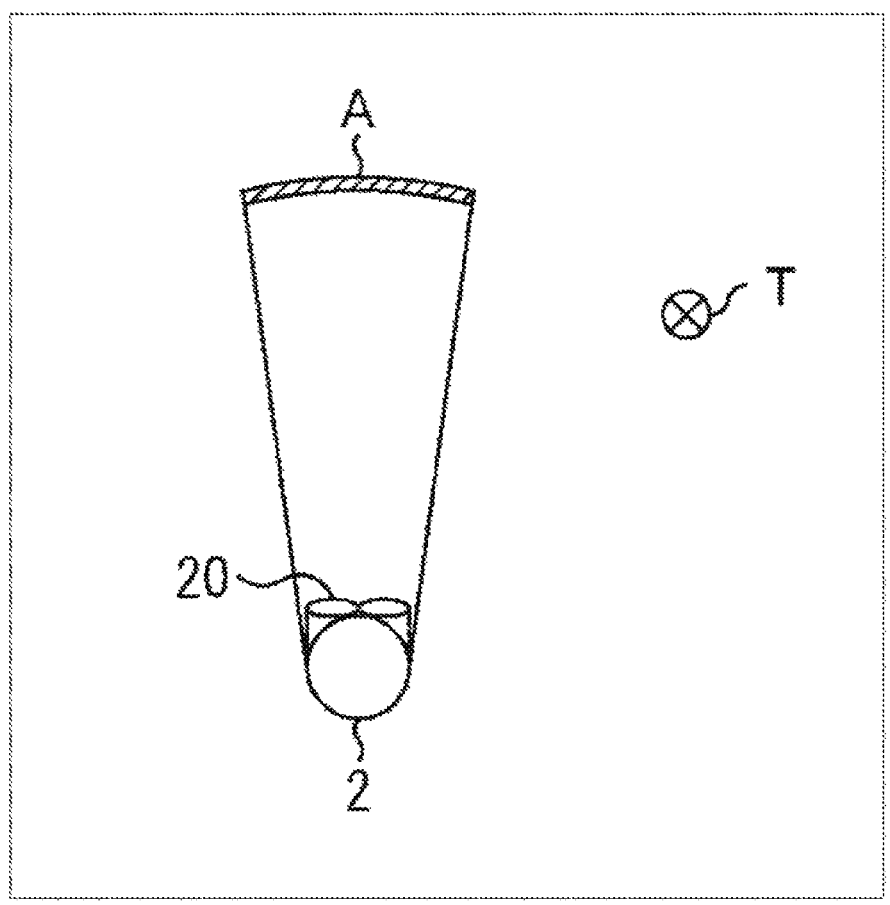
FIG. 16 is a diagram showing an example of a designation of a position of a target.

When there is a target T that is desired to be indicated outside of the display region A on the display 206 of the HMD 20 in Steps S541 to S542, as in Steps S521 and S522 of FIG. 11, a position of the target T is designated. Here, a position of the target T (for example, a sound-added AR object or the like) outside of the display region A is designated in the cylindrical coordinate system C as shown in, for example, FIG. 16.

Figure 17:
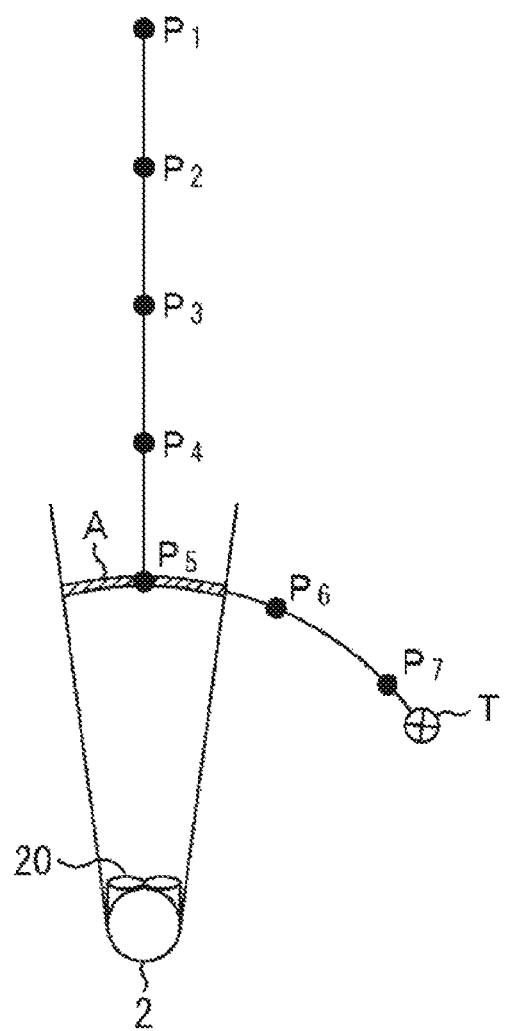
FIG. 17 is a diagram showing an example of setting a trajectory of a sound-added AR object.

Returning to FIG. 15, a trajectory of a sound object and a sound object image are respectively set in Steps S543 and S544 as in Steps S523 and S524 of FIG. 11. Here, for example, the positions P1 to P7 of the cylindrical coordinate system C are set as the trajectory of the sound object as shown in FIG. 17. On the trajectory of FIG. 17, the sound object sequentially moves through the positions P1 to P5, approaches the user 2 who is at the center of the cylindrical coordinate system C to some degree, then sequentially moves through the positions P5 to P7, and moves in the right direction of the user 2. In FIG. 17, in addition to the trajectory of the positions P1 to P5, a part of the trajectory of the positions P5 and P6 is within the display region A. In addition, as the sound object image, for example, "!" (an exclamation mark) or the like can be set.

Figure 15:
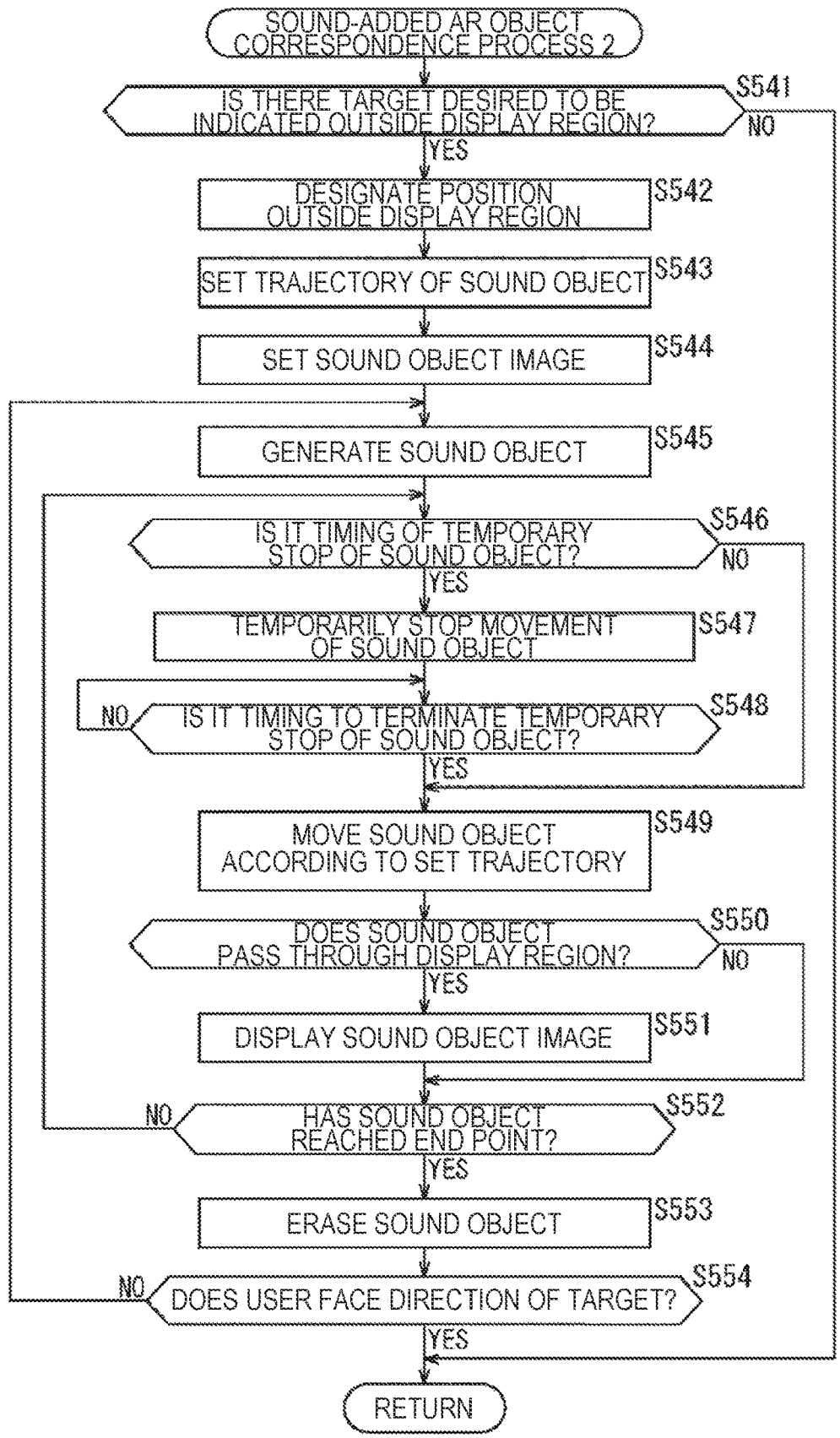
FIG. 15 is a flowchart describing a sound-added AR object correspondence process 2.

Returning to the flowchart of FIG. 15, the drawing/sound control unit 523 controls the sound processing unit 506 to generate a sound object at the starting point in the cylindrical coordinate system C, i.e., the position P1 on the trajectory of FIG. 17 in Step S545. When the sound object is generated, the process proceeds to Step S546.

The drawing/sound control unit 523 determines whether it is a timing of a temporary stop of the sound object in Step S546. When it is determined to be a timing of a temporary stop of the sound object in Step S546, the process proceeds to Step S547.

The drawing/sound control unit 523 controls the sound processing unit 506 to temporarily stop the movement of the sound object in Step S547. Accordingly, the sound object stops at a certain position on the trajectory. Then, it is determined whether it is a timing to terminate the temporary stop of the sound object that temporarily stops in Step S548. When it is determined in Step S548 that it is not to be the timing to terminate the temporary stop, the determination process of Step S548 is repeated. In other words, in that case, the sound object continues staying at a certain position on a certain trajectory.

On the other hand, when it is determined that it is the timing to terminate the temporary stop in Step S548, the process proceeds to Step S549. In addition, when it is determined in Step S546 that it is not the timing of a temporary stop of the sound object, the processes of Steps S547 and S548 are skipped, and the process proceeds to Step S549.

In Step S549, the drawing/sound control unit 523 controls the sound processing unit 506 to move the sound object at a constant speed to follow the trajectory set by the trajectory setting unit 522.

In Steps S550 and S551, it is determined whether the sound object passes through the display region A, and when the sound object passes through the display region A, a sound object image is displayed on the display 206 of the HMD 20, as in Steps S527 and S528 of FIG. 11. In addition, in Step S552, the drawing/sound control unit 523 determines whether the sound object has reached the end point. When it is determined that the sound object has not reached the end point in Step S552, the process returns to Step S546, and the succeeding processes are repeated.

In other words, by repeating the processes of Steps S546 to S552, the sound object starts the output of a sound from the position P1 serving as the starting point on the trajectory of FIG. 17, and while the output of the sound continues, the sound object sequentially moves through the positions P2 to P5 on a straight line at a constant speed. Then, when reaching the position P5, the sound object temporarily stops to stay at the position for a predetermined period of time. Then, the sound object resumes moving, changes its traveling direction from the position P5 that is the end point of the straight trajectory to the direction of the target T, and then moves from the positions P5 to P7, and when it reaches the position P7, the output of the sound stops.

On the entire trajectory, however, a partial section (for example, the section from the positions P1 to P5 or the like) is in the display region A as viewed from the user 2, and when the sound object is in the section, the sound object image is displayed in the display region A of the display 206, and further it temporarily stops at the position P5. Therefore, when the exclamation mark ("!") is set as the sound object image, for example, there is a high possibility of the user noticing the exclamation mark approaching him or her, and the possibility can be further heightened since the exclamation mark temporarily stops in the display region.

If the sound object is determined to have reached the end point, i.e., the position P7 in Step S552, the process proceeds to Step S553. In Step S553, the drawing/sound control unit 523 controls the sound processing unit 506 to erase the sound object that has reached the end point.

Figure 18:
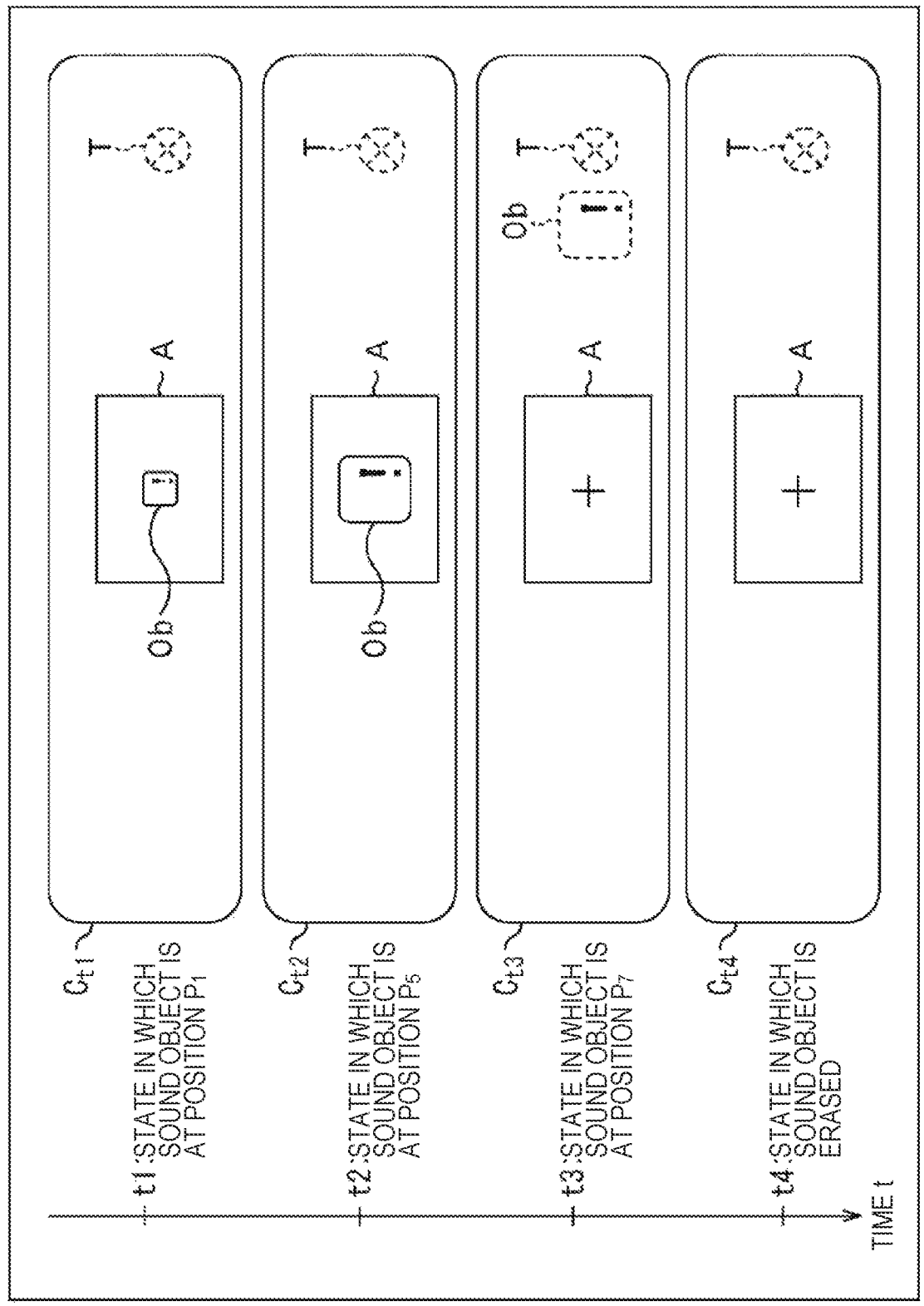
FIG. 18 is a diagram showing a display example of a sound object image.

As shown in FIG. 18, specifically, in the case in which the up-down direction of the drawing is set as a time axis, when the sound object is at the position P1 at a time t1, the sound object Ob is in the display region A as shown in a cylindrical coordinate system $C_{t1}$, and thus, the output of a sound and the display of a sound object image are performed. In this case, since the position P1 is farther from the user 2 than the position P5, the sound object image of the exclamation mark is displayed to be small.

Then, when the sound object moves to the position P5 at a time t2, the sound object Ob is in the display region A as shown in a cylindrical coordinate system $C_{t2}$, and thus the output of the sound and the display of the sound object image are performed. In this case, since the position P5 is closer to the user 2 than the position P1, the sound object image of the exclamation mark is displayed to be large. In other words, as the sound object sequentially moves on the trajectory of the positions P1 to P5 in practice, the sound object image of the exclamation mark displayed in the display region A is gradually enlarged. Accordingly, the user 2 visually recognizes the sound object image of the exclamation mark as well as the sound, and thus can intuitively perceive that the target T is outside the display region A.

In addition, the sound object thereafter changes its traveling direction from the position P5 that serves as the end point of the straight trajectory to the direction of the target T to move from the positions P5 to P7, and a part of the section of the positions P5 and P6 is included in the display region A. Thus, the user 2 sees the sound object image of the exclamation mark that has approached him or her temporarily stop and then move to the right, and therefore can intuitively perceive that the target T is on the right side of the display region A.

Then, when the sound object Ob moves to the position P7 at a time t3, the sound object Ob is positioned outside of the display region A as shown in a cylindrical coordinate system $C_{t3}$, and only the sound is output. Then, when the sound object Ob reaches the position P7, the sound object is erased and the output of the sound stops as shown in a cylindrical coordinate system $C_{t4}$ at a time t4.

Returning the flowchart of to FIG. 15, when the sound object that has reached the end point is erased in the process of Step S553, the process proceeds to Step S554. In Step S554, it is determined whether the user 2 is facing the direction of the position of the target T as in Step S531 of FIG. 11. When it is determined that the user 2 is not facing the direction of the position of the target T in Step S554, the process returns to Step S545.

Then, by repeating the processes of Steps S545 to S554, the process for indicating the target T outside of the display region A is performed again using the sound of the sound object and the sound object image thereof, and when it is determined that the user 2 is facing the direction of the position of the target T, the sound-added AR object correspondence process 2 of FIG. 15 ends. Then, the process returns to Step S506 of FIG. 7, and the succeeding processes are repeated.

The sound-added AR object correspondence process 2 has been described above. In the sound-added AR object correspondence process 2, in the case in which, while a sound-added AR object moves to a designated position (for example, the position of the target T such as the sound-added AR object), the output of the sound of the sound object is controlled, and when the sound object passes through the display region A, the sound object image thereof is displayed in the display region A. In addition, since the sound object image can temporarily stop in the display region A, the position outside of the display region A is more exactly indicated using a sound and an image, and thus the user can be surely aware of the position.

(AR Object Correspondence Process 2)

Next, the AR object correspondence process 2 that corresponds to Step S103 of FIG. 6 executed by the AR processing unit 500 will be described with reference to the flowchart of FIG. 19.

The direction of the HMD 20 is computed, and further the coordinates of display region coordinates A on the display 206 of the HMD 20 are computed in Steps S561 and S562 as in Steps S501 and S502 of FIG. 7.

In Step S563, the drawing/sound control unit 523 matches the height of the sound object (the AR object) with the central height of the display region A of the HMD 20 based on the information indicating the direction of the HMD 20 from the HMD direction computation unit 503.

Figure 20:
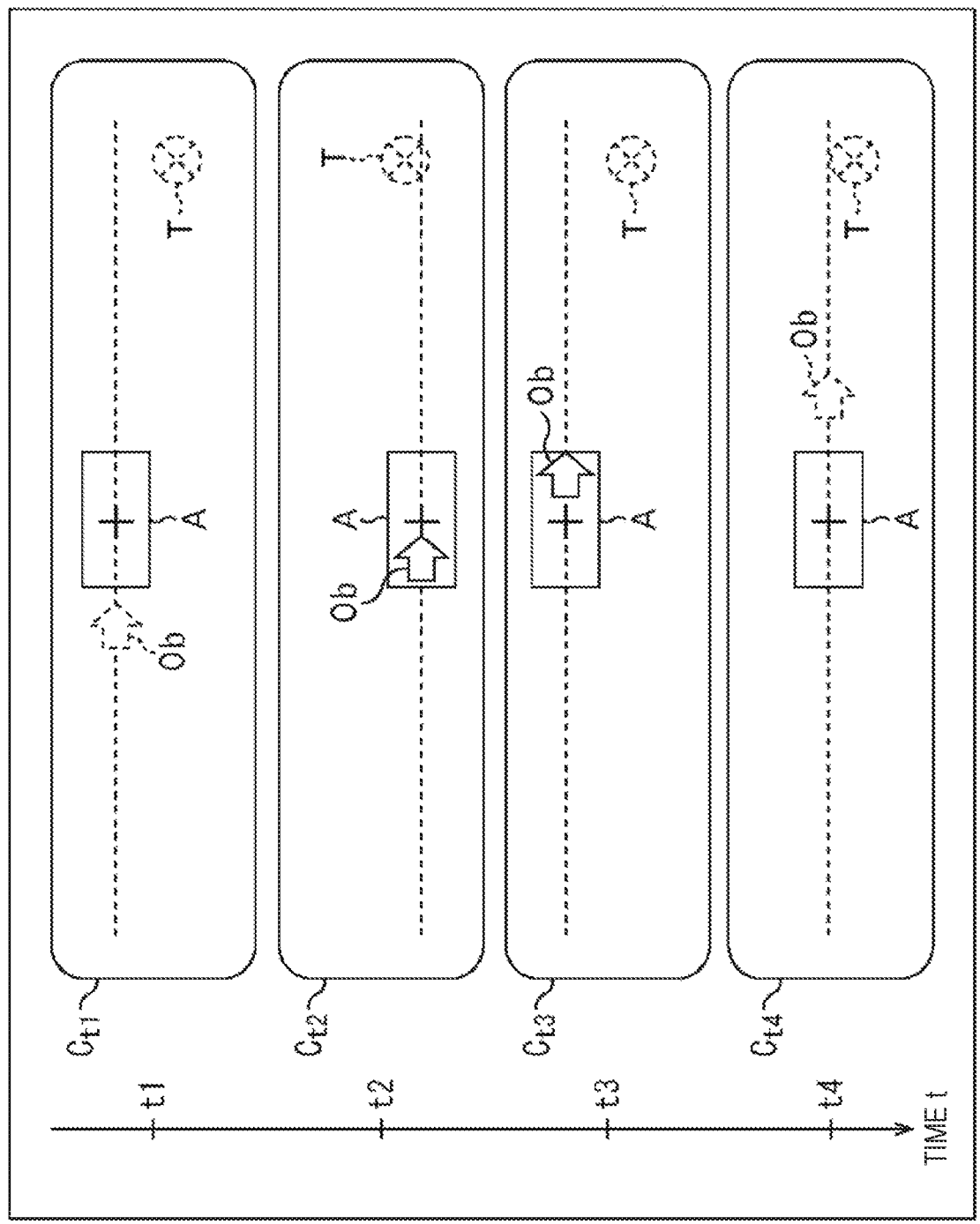
FIG. 20 is a diagram showing a display example of a sound object image.

As shown in FIG. 20, when the up-down direction of the drawing is set as a time axis, specifically, the sound object Ob (the AR object Ob) moves toward the target T at a time t1 as shown in a cylindrical coordinate system $C_{t1}$; however, when the user 2 who is wearing the HMD 20 on his or her head shakes his or her head up and down, for example, the central height of the display region A changes. Since the user 2 has his or her head face down at a time t2, the central height of the display region A moves in the lower direction of the drawing as shown in a cylindrical coordinate system $C_{t2}$, but the height of the sound object Ob is matched with the central height of the display region A. In addition, since the user 2 has his or her head face up at a time t3, the central height of the display region A moves in the upper direction of the drawing as shown in a cylindrical coordinate system $C_{t3}$, but the height of the sound object Ob is matched with the central height of the display region A.

By performing the control as described above, the sound object Ob (the AR object Ob) is controlled to have the same height as the central height of the display region A of the HMD 20 at all times, and as a result, the sound object Ob passes through the display region A at least once, and thus even when the user 2 shakes his or her head up and down, or the like, he or she can visually recognize a sound object image such as an arrow.

Figure 19:
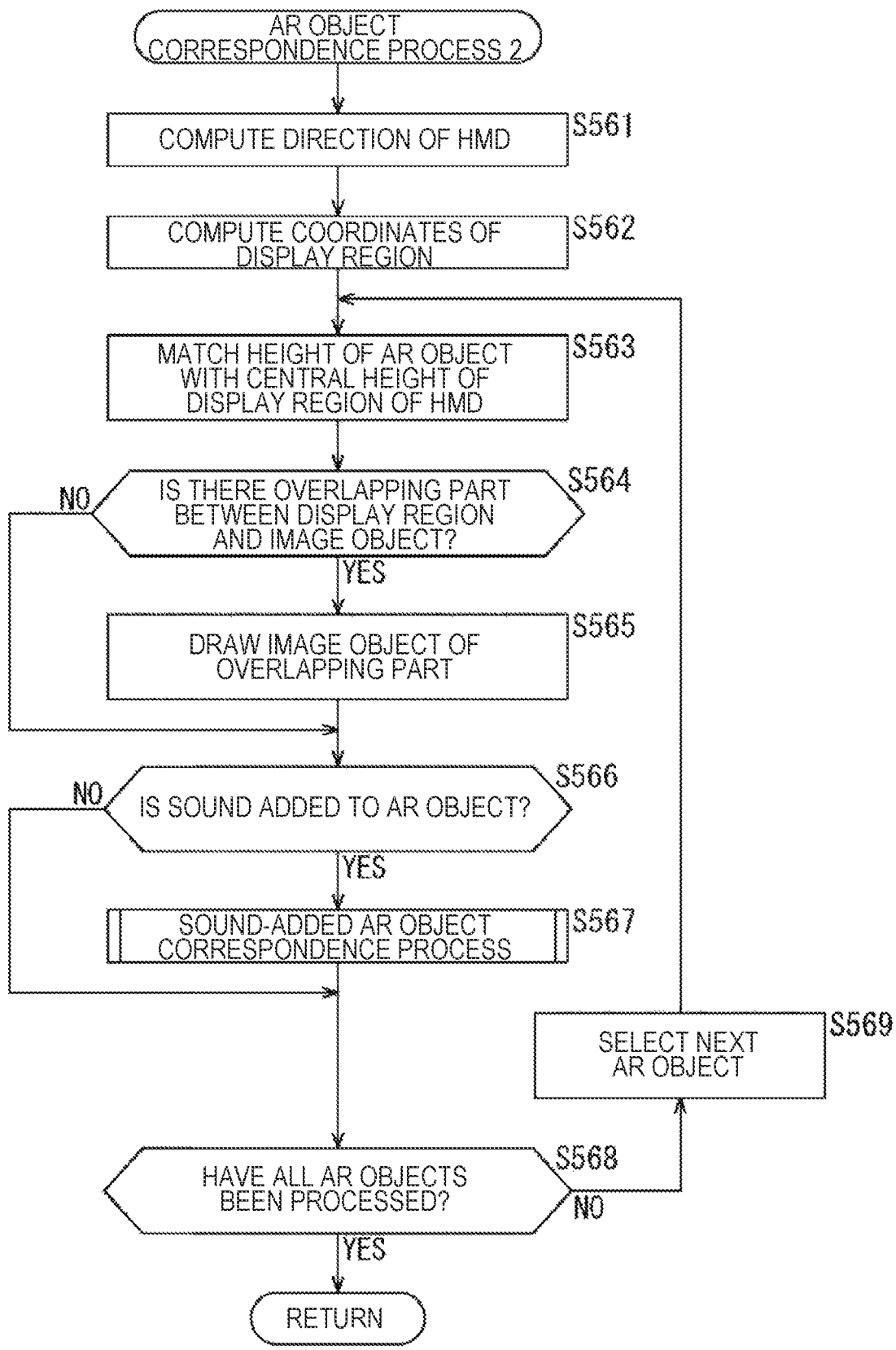
FIG. 19 is a flowchart describing an AR object correspondence process 2.

Returning to the flowchart of FIG. 19, an image object of the overlapping part of the display region A is drawn and, when the AR object is a sound-added AR object, the sound-added AR object correspondence process of FIG. 11 or FIG. 15 is performed in Steps S564 to S569 as in Steps S503 to S508 of FIG. 7.

The AR object correspondence process 2 has been described above. When the sound-added AR object correspondence process is performed in the AR object correspondence process 2, the height of a sound object (an AR object) is matched with the central height of the display region A of the display 20 of the HMD 20 in the cylindrical coordinate system C, and thus even when the user shakes his or her head or the like, a position outside of the display region A is more exactly indicated, and the user can be aware of the position.

Note that, although the case in which the sound object Ob shifts up and down in the display region A has been described in FIG. 20, the AR object correspondence process 2 can also be applied when the sound object Ob shifts up and down outside of the display region A. For example, when the user 2 who is wearing the HMD 20 on his or her head shakes the head up and down, the central height of the display region A changes, and even when the sound object Ob moves up and down outside of the display region A, the height of the sound object Ob can be matched with the central height of the display region A.

Accordingly, even when the user 2 significantly moves his or her head up and down and thus the sound object Ob significantly deviates from the display region A, for example, the sound object Ob can be caused to traverse the display region A, and the user 2 can be exactly aware of the sound object image.

In addition, although the case in which the height of the sound object Ob that has shifted up and down is matched with the central height of the display region A has been described in FIG. 20, the height of the sound object Ob can be arbitrarily set without being limited to the central height of the display region A as long as the sound object Ob (or the sound object image) can pass through the display region A.

Note that the AR object correspondence process 2 of FIG. 19 is performed, for example, 30 times per second for each AR object.

(Two-direction Movement of Sound Objects)

Although the example described above shows that movement of one sound object is controlled to indicate a position of the target T, the position of the target T may be indicated by controlling the movement of a plurality of sound objects.

Figure 21:
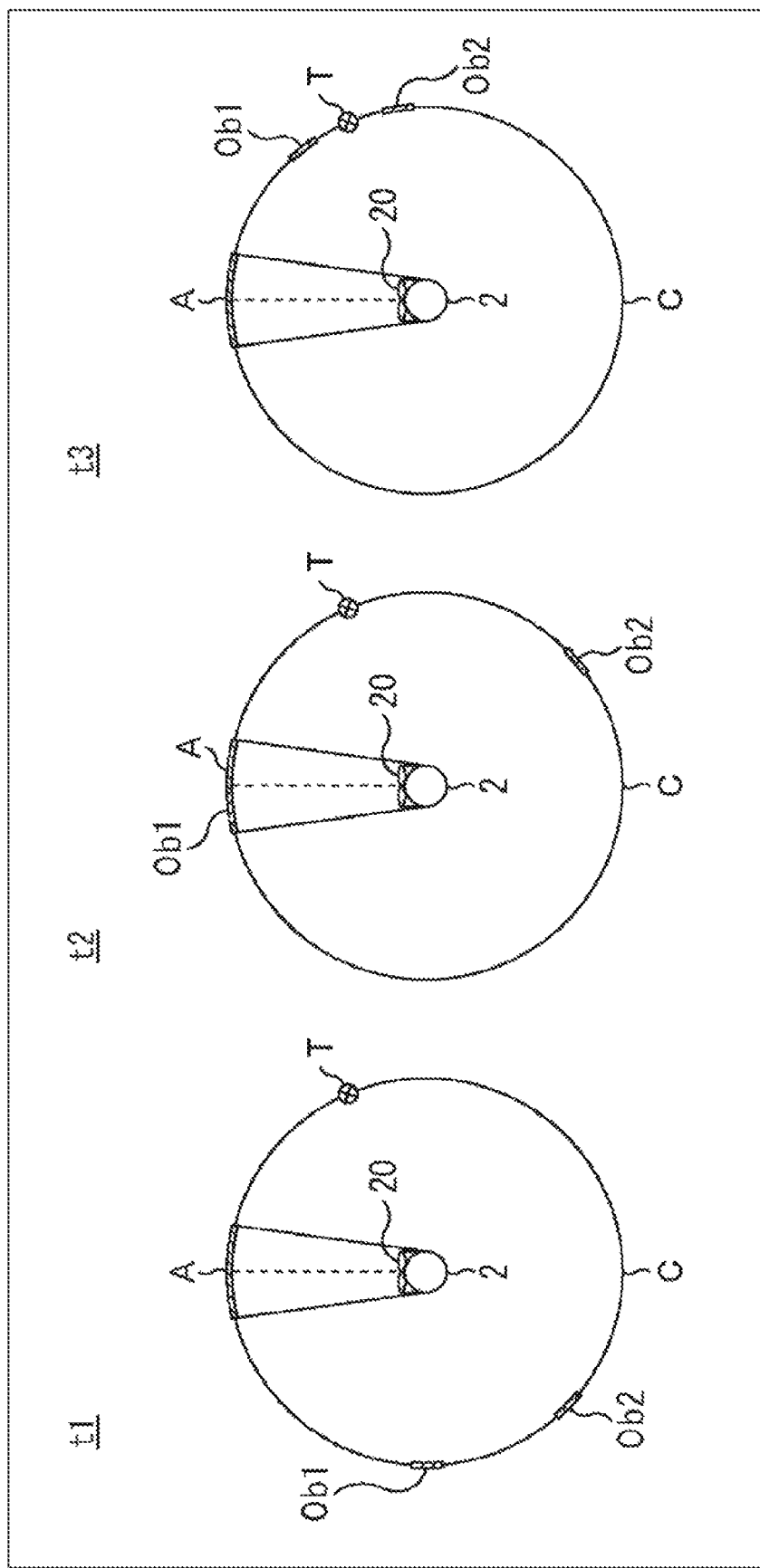
FIG. 21 is a diagram showing an example of a two-direction movement of sound objects.

As shown in FIG. 21, a sound object Ob1 and a sound object Ob2 are generated as sound objects for indicating a position of the target T, and movements thereof are controlled to indicate the position of the target T. Specifically, when a left-right direction of the drawing is set as a time axis, the two sound objects Ob1 and Ob2 are positioned on the rear left side of the user 2 at a time t1. Then, at a time t2 after a predetermined interval time elapses from the time t1, the sound object Ob1 moves to the front of the user 2, and the sound object Ob2 moves to the rear right side of the user 2. In addition, at a time t3 after a predetermined interval time elapses from the time t2, the two sound objects Ob1 and Ob2 move near the target T on the front right side of the user 2.

In the example of FIG. 21 as described above, the plurality of sound objects Ob1 and Ob2 are generated, and while one sound object Ob1 is kept moving clockwise toward the position of the target T and the other sound object Ob2 is moving counterclockwise toward the position of the target T, the output of sounds of the sound objects is controlled. However, by assigning discrete sounds as the sound of the sound object Ob1 and the sound of the sound object Ob2 and differentiating timings for outputting the sounds, the sound can be independently reproduced. In other words, it is known that, when the sounds of the sound object Ob1 and the sound object Ob2 are the same, it is difficult to distinguish a stereoscopic sound; however, if the frequency, tempo, genre, or the like of music is changed, for example, it is possible to independently reproduce sounds of a plurality of sound objects.

Accordingly, when a plurality of sound objects move toward a position of the target T, the objects move to both sides of the user 2, such as front and rear, left and right, or up and down sides of the user 2, and thus, for example, even when the user 2 moves and accordingly the display region A of the HMD 20 moves in the cylindrical coordinate system C, a sound object image can surely pass through the display region A.

<Details of a Drawing Process>
(Path of AR Drawing)

Figure 22:
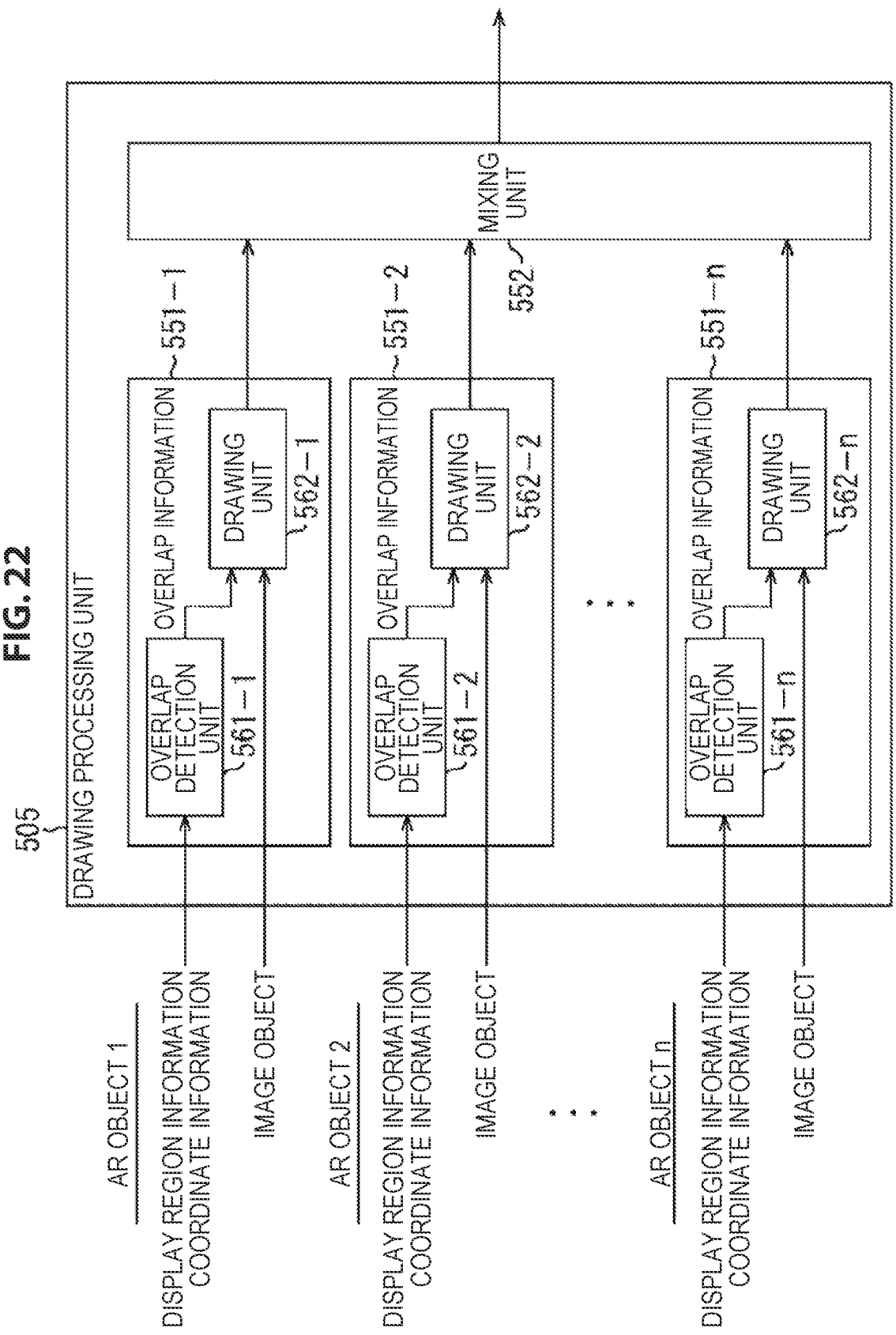
FIG. 22 is a diagram showing an example of an image drawing path of an AR object.

FIG. 22 is a diagram showing an example of a path of drawing of an AR object.

As shown in FIG. 22, the drawing processing unit 505 is provided with image object processing units 551-1 to 551-n (n is an integer equal to or greater than 1), and performs a drawing process of an image object included in one or a plurality of AR objects. Specifically, the image object processing unit 551-1 is constituted by an overlap detection unit 561-1 and a drawing unit 562-1.

Among AR objects 1 to n, the overlap detection unit 561-1 receives an input of coordinate information of an image object included in the AR object 1 and display region information. The overlap detection unit 561-1 detects an overlapping part of the display region A and the target image object (the AR object 1) based on the coordinate information of the image object and the display region information, and supplies the detection result to the drawing unit 562-1 as overlap information.

The drawing unit 562-1 draws the image object of the overlapping part in the display region A of the display 206 based on the overlap information from the overlap detection unit 561-1.

The image object processing units 551-2 to 551-n are configured the same as the image object processing unit 551-1. In other words, the image object processing units 551-2 to 551-n perform the process of drawing an overlapping part with the display region A for each image object included in each AR object. When there are a plurality of AR objects, however, a mixing unit 552 performs a mixing process, and then the result is output to the display 206 of the HMD 20.

<Details of Sound Processing>
(Overview of VPT)

Figure 23:
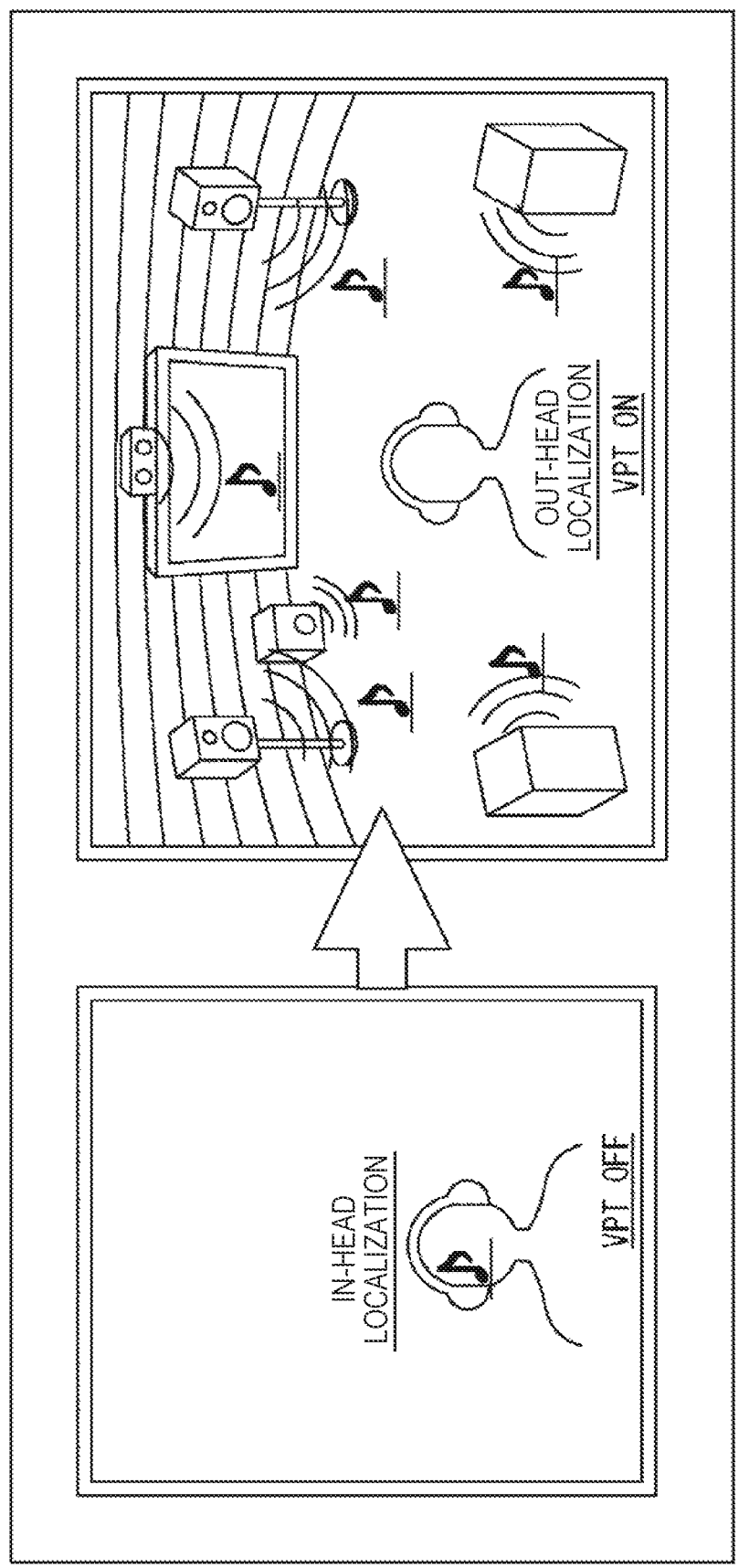
FIG. 23 is a diagram showing the concept of VPT.

In order to realize the output of a sound of a sound object with the headphones 207 of the HMD 20 as described above, a virtual surround technology is used. In the present technology, it is preferable to use VPT (a registered trademark of Sony Corporation) as such a virtual surround technology. In VPT (Virtualphones Technology), sounds are localized at the outside of the head of a user, rather than the inside of the head as shown in FIG. 23, and thus a sound field in which sounds seem to be naturally reproduced from speakers disposed at the front and the rear sides can be created.

Figure 24:
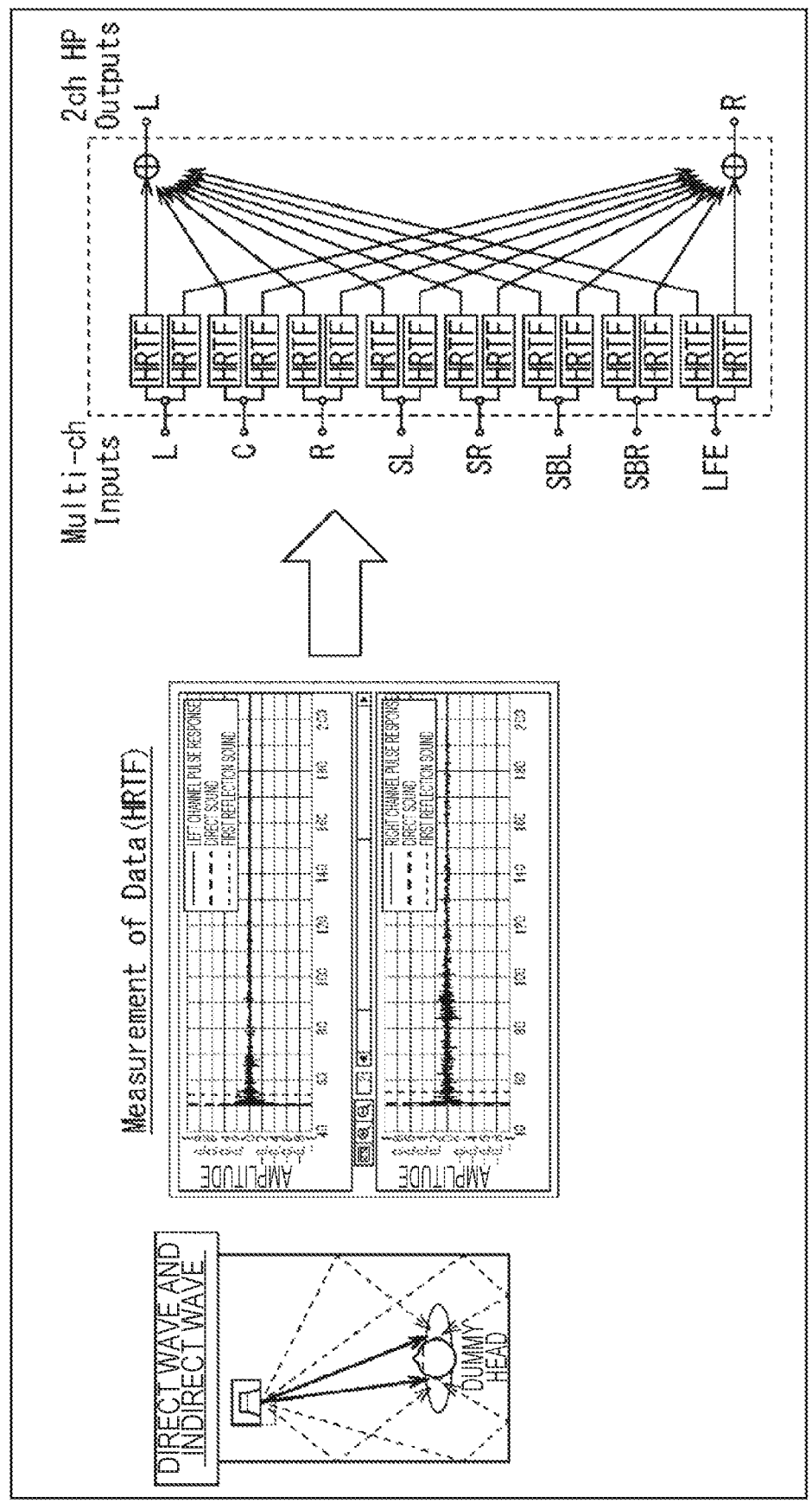
FIG. 24 is a diagram showing an example of signal processing of VPT.

Specifically, in the VPT, a head-related transfer function (HRTF) is measured as a characteristic of a transfer from a sound source to both ears, the measured HRTF is convoluted into an input signal as shown in FIG. 24, and thereby while sounds are reproduced from headphones, the same sound field as one generated when sounds are heard from speakers of, for example, a 5.1 channel and a 7.1 channel can be realized. The sound processing of the present technology to which the VPT is applied will be described below. As the VPT, however, 7-channel surround (not using a 0.1-channel subwoofer) is set to be applied.

(First Sound Path)

Figure 25:
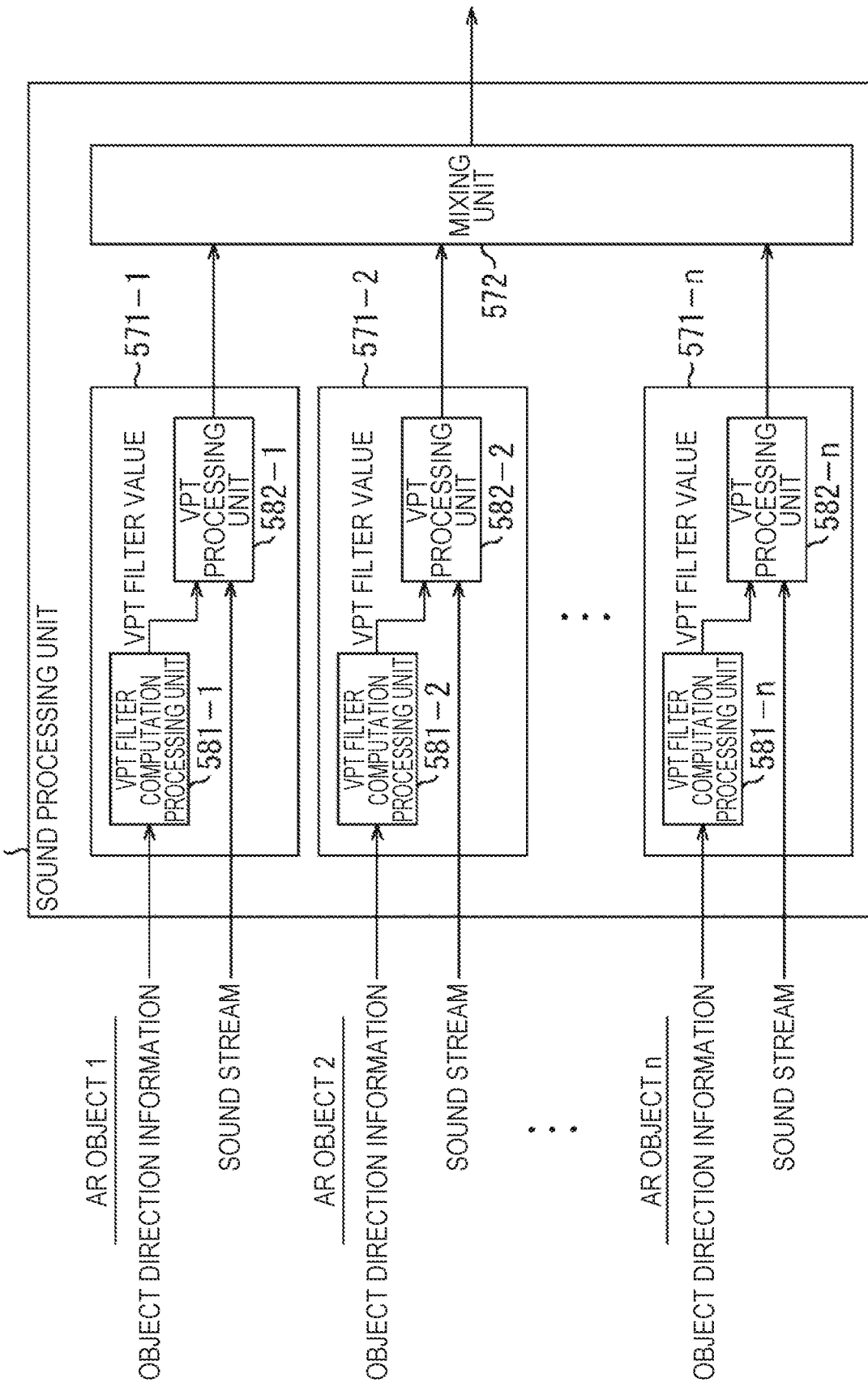
FIG. 25 is a diagram for describing a first sound path of an AR object.

FIG. 25 is a diagram for describing a first sound path of an AR object. As shown in FIG. 25, the sound processing unit 506 is provided with sound object processing units 571-1 to 571-n (n is an integer equal to or greater than 1), and performs sound processing on sound objects included in one or a plurality of AR objects. Specifically, the sound object processing unit 571-1 is constituted by a VPT filter computation processing unit 581-1 and a VPT processing unit 582-1.

The VPT filter computation processing unit 581-1 receives an input of object direction information of the AR object 1 among the AR objects 1 to n. The object direction information represents a direction of a sound object from the user 2 who is wearing the HMD 20, and for example, information of the differential angle of FIG. 10 can be used.

The VPT filter computation processing unit 581-1 computes a VPT filter value based on the object direction information of the AR object 1, and supplies the value to the VPT processing unit 582-1. When the VPT of the 7-channel surround is used, for example, phantom processing or the like is performed on a VPT filter value to dispose closer to all positions of sound objects, and a value that is likely to give sound information to a plurality of channels among the 7 channels is obtained. However, the coordinates of the display region A may be reflected on the VPT filter value if necessary.

When being supplied with the VPT filter value from the VPT filter computation processing unit 581-1, the VPT processing unit 582-1 updates the VPT filter value. For example, because the object direction information is computed 30 times per second, VPT filter values are computed and updated according to the interval. In addition, the VPT processing unit 582-1 receives supply of a sound stream of sound objects from the AR object information acquisition unit 502. The VPT processing unit 582-1 convolutes an HRTF into a sound stream that serves as an input signal according to the VPT filter value. The VPT-processed sound stream is supplied to a mixing unit 572. When the VPT of the 7-channel surround is used, for example, when HRTF coefficients of the 7 channels are multiplied by the input signal to be convoluted thereinto, an output of two channels can be obtained.

The sound object processing units 571-2 to 571-n are each configured the same as the sound object processing unit 571-1. In other words, the sound object processing units 571-2 to 571-n perform the VPT process according to VPT filter values for each sound stream of sound objects included in the respective AR objects. Accordingly, the mixing unit 572 receives supply of VPT-processed sound streams of the AR objects 2 to n. The mixing unit 572 performs a mixing process on the VPT-processed sound streams 1 to n, and outputs the result to the headphones 207 of the HMD 20. The sound streams have, for example, a waveform of a way file format, and the waveform of the VPT-processed sound signals is reproduced from the headphones 207.

(Basic Sound Processing)

Figure 26:
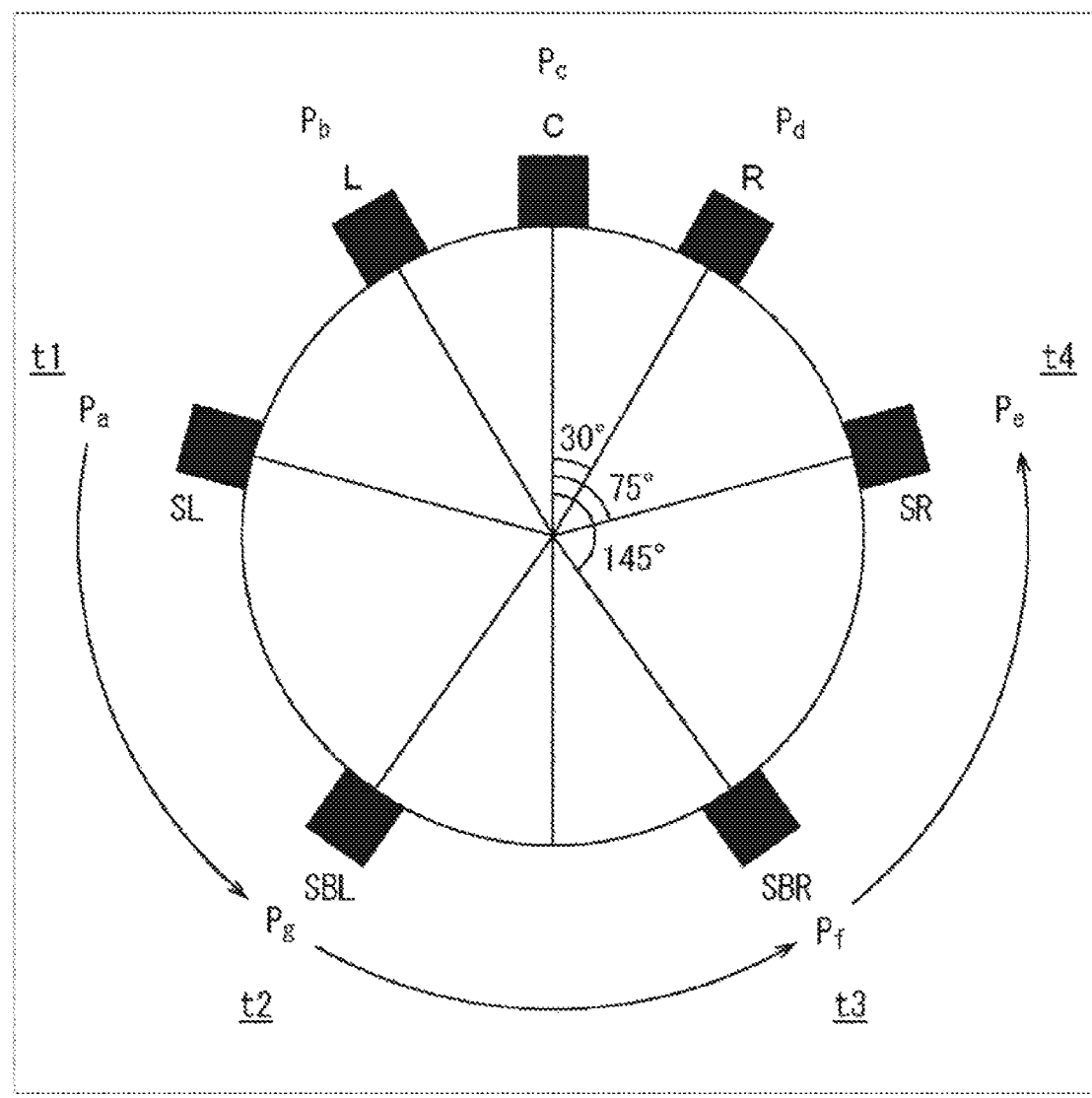
FIG. 26 is a diagram for describing basic sound processing.

FIG. 26 is a diagram for describing basic sound processing of the first sound path.

When no subwoofer is used in 7.1-channel surround, there are 7 positions of speakers which are C, L, R, SL, SR, SBL, and SBR as shown in FIG. 26. In other words, in 7-channel surround, a center speaker (C) is disposed in front of the user 2 who is positioned at the center of a circle, and front speakers (L and R) are disposed at the positions on the left and right sides that form an angle of 30° with the front. In addition, surround speakers (SL and SR) are disposed at the positions on the left and right sides that form an angle of 75° with the front, and surround back speakers (SBL and SBR) are further disposed at the positions on the left and right sides that form an angle of 145° with the front. Each of the speakers has HRTFs for the left and right ears.

Here, a case in which a trajectory that sequentially passes through a position Pg and a position Pf from a position Pa (a starting point) to a position Pe (an end point) is set as a trajectory of a sound object included in the AR object 1 is assumed as shown in FIG. 26. In this case, positions of the sound object substantially coincide with the disposition of the speakers of the 7-channel surround, and thus the sound object moving in one direction may be assigned with the HRTFs of the speakers corresponding to the positions of the sound object.

Specifically, at a time t1 (a first order), the VPT filter computation processing unit 581-1 decides to use the HRTFs of the position Pa, i.e., of SL-ch(a) of the 7-channel surround according to the object direction information, and updates the VPT filter value of the VPT processing unit 582-1. However, silence is assigned to channels corresponding to the positions Pb to Pg. The VPT processing unit 582-1 convolutes the HRTF of the SL-ch(a) for the left ear into the waveform of the way file format (for example, a "p" sound) input as a sound signal according to the VPT filter value. In addition, the HRTF of the SL-ch(a) for the right ear is separately convoluted into the sound signal in a similar manner. Since the sound object is only for one direction and there is one sound path in the basic sound processing, the mixing unit 572 outputs the sound signal VPT-processed by the VPT processing unit 582-1 to the headphones 207. Accordingly, the waveform of the VPT-processed sound signal is reproduced from the headphones 207 of the HMD 20.

Next, when the object direction information indicates the position Pg, the VPT filter computation processing unit 581-1 decides to use the HRTFs of SBL-ch(g) of the 7-channel surround, and updates the VPT filter value at a time t2 (a second order) after a predetermined interval time elapses from the time t1. The VPT processing unit 582-1 convolutes the HRTFs of the SBL-ch(g) into a sound signal according to the VPT filter value. Accordingly, the waveform of the VPT-processed sound signal to which the HRTFs of the SBL-ch(g) are applied is reproduced from the headphones 207 of the HMD 20.

Next, when the object direction information indicates the position Pf, the VPT filter computation processing unit 581-1 decides to use the HRTFs of SBR-ch(f) of the 7-channel surround, and updates the VPT filter value at a time t3 (a third order) after a predetermined interval time elapses from the time t2. The VPT processing unit 582-1 convolutes the HRTFs of the SBR-ch(f) into a sound signal according to the VPT filter value. Accordingly, the waveform of the VPT-processed sound signal to which the HRTFs of the SBR-ch(f) are applied is reproduced from the headphones 207 of the HMD 20.

Subsequently, when the object direction information indicates the position Pe, the VPT filter computation processing unit 581-1 decides to use the HRTFs of SR-ch(e) of the 7-channel surround, and updates the VPT filter value at a time t4 (a fourth order) after a predetermined interval time elapses from the time t3. The VPT processing unit 582-1 convolutes the HRTFs of the SR-ch(e) into a sound signal according to the VPT filter value. Accordingly, the waveform of the VPT-processed sound signal to which the HRTFs of the SR-ch(e) are applied is reproduced from the headphones 207 of the HMD 20.

As the series of processes are performed described above, the sound reproduced from the headphones 207 of the HMD 20 can be heard as if the "p" sound sequentially moves through the stereoscopic positions of the position Pa, the position Pg, the position Pf, and the position Pe regardless of the fact that the 2-channel headphones are being used. Note that the "p" sound given as sound information of the sound object is an example, and another single sound may be used.

(Sound Processing of Two-Direction Movement)

Figure 27:
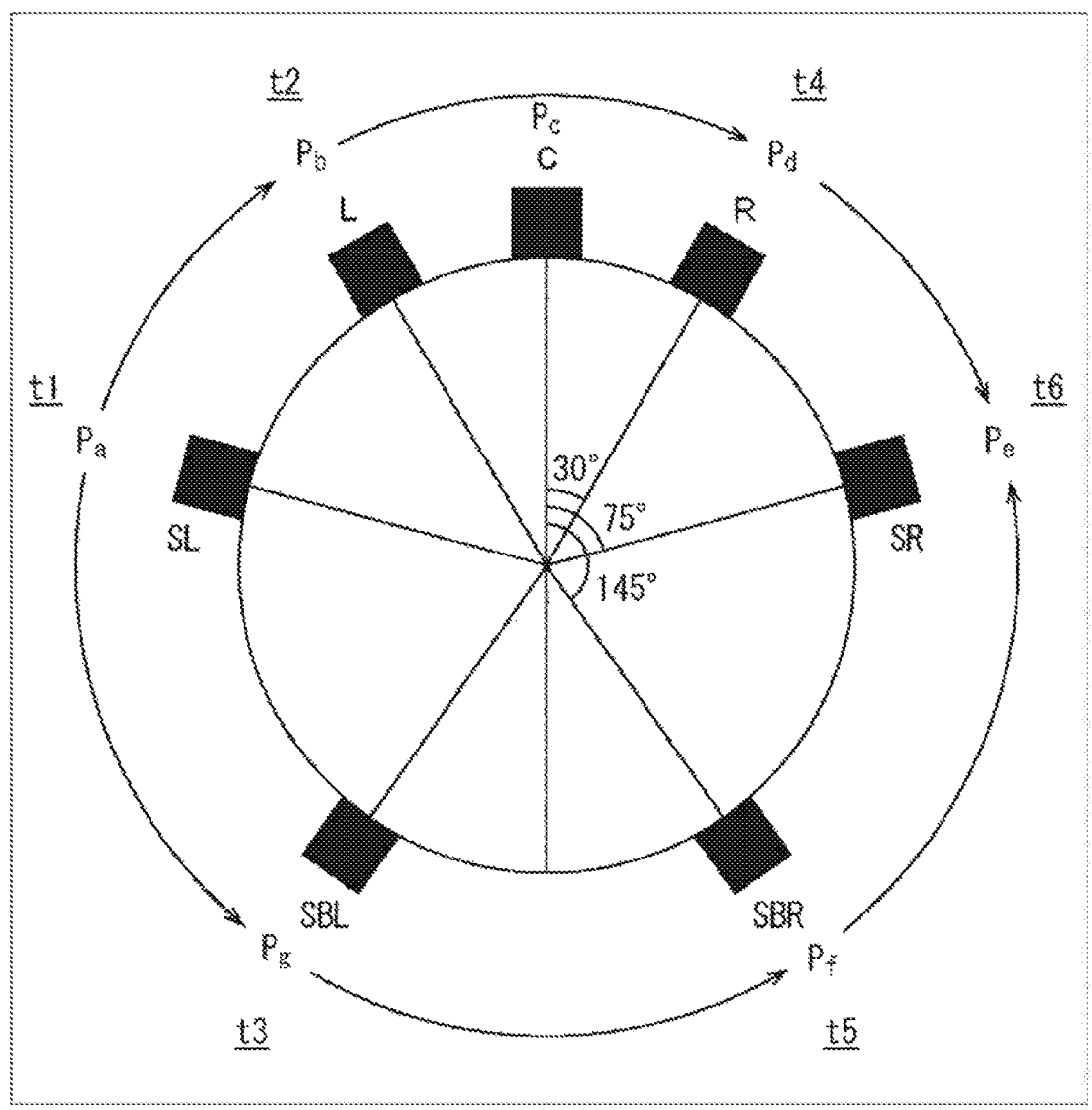
FIG. 27 is a diagram for describing sound processing of a two-direction movement.

FIG. 27 is a diagram for describing sound processing of two-direction movement on the first sound path.

As shown in FIG. 27, a case in which a first trajectory that sequentially passes through the position Pb and the position Pd from the position Pa (the starting point) to the position Pe (the end point) is set as a trajectory of a sound object 1 included in an AR object 1 and a second trajectory that sequentially passes through the position Pg and the position Pf from the position Pa (the starting point) to the position Pe (the end point) is set as a trajectory of a sound object 2 included in an AR object 2 is assumed. In this case, the positions of the sound objects 1 and 2 on the first trajectory and the second trajectory substantially coincide with the disposition of the speakers of the 7-channel surround, and thus the two sound objects 1 and 2 moving in two directions may be assigned with the HRTFs of the speakers corresponding to the positions of the sound objects. An output timing of a sound on the first trajectory and an output timing of a sound on the second trajectory are set to be different.

Specifically, when object direction information indicates the position Pa that serves as the starting point of the first trajectory and the second trajectory, the VPT filter computation processing units 581-1 and 581-2 decide to use the HRTFs of the SL-ch(a) of the 7-channel surround, and updates the VPT filter value at a time t1 (a first order). However, silence is assigned to the channels corresponding to the positions Pb to Pg. The VPT processing units 582-1 and 582-2 convolute the HRTF of the SL-ch(a) for the left ear into a sound signal according to the VPT filter value. In addition, the HRTF of the SL-ch(a) for the right ear is separately convoluted into another sound signal in a similar manner. In this example of sound processing of the two-direction movement, there are two sound paths of a sound object, and thus the mixing unit 572 selects one sound signal among the sound signals VPT-processed by the VPT processing units 582-1 and 582-2 in an alternating manner, and outputs the sound signal to the headphones 207 of the HMD 20. Accordingly, for example, the waveform of the VPT-processed sound signal is reproduced from the headphones 207 of the HMD 20.

Next, when the object direction information indicates the position Pb, the VPT filter computation processing unit 581-1 decides to use the HRTFs of L-ch(b) of the 7-channel surround, and updates the VPT filter value at a time t2 (a second order) after a predetermined interval time elapses from the time t1. The VPT processing unit 582-1 convolutes the HRTFs of the L-ch(b) into a sound signal according to the VPT filter value. Accordingly, the waveform of the VPT-processed sound signal to which the HRTFs of the L-ch(b) are applied is reproduced from the headphones 207 of the HMD 20.

Next, when the object direction information indicates the position Pg, the VPT filter computation processing unit 581-2 decides to use the HRTFs of SBL-ch(g) of the 7-channel surround, and updates the VPT filter value at a time t3 (a third order) after a predetermined interval time elapses from the time t1. The VPT processing unit 582-2 convolutes the HRTFs of the SBL-ch(g) into a sound signal according to the VPT filter value. Accordingly, the waveform of the VPT-processed sound signal to which the HRTFs of the SBL-ch(g) are applied is reproduced from the headphones 207 of the HMD 20.

Next, when the object direction information indicates the position Pd, the VPT filter computation processing unit 581-1 decides to use the HRTFs of R-ch(d) of the 7-channel surround, and updates the VPT filter value at a time t4 (a fourth order) after a predetermined interval time elapses from the time t2. The VPT processing unit 582-1 convolutes the HRTFs of the R-ch(d) into a sound signal according to the VPT filter value. Accordingly, the waveform of the VPT-processed sound signal to which the HRTFs of the R-ch(d) are applied is reproduced from the headphones 207 of the HMD 20.

Next, when the object direction information indicates the position Pf, the VPT filter computation processing unit 581-2 decides to use the HRTFs of SBR-ch(f) of the 7-channel surround, and updates the VPT filter value at a time t5 (a fifth order) after a predetermined interval time elapses from the time t3. The VPT processing unit 582-2 convolutes the HRTFs of the SBR-ch(f) into a sound signal according to the VPT filter value. Accordingly, the waveform of the VPT-processed sound signal to which the HRTFs of the SBR-ch(f) are applied is reproduced from the headphones 207 of the HMD 20.

Subsequently, when the object direction information indicates the position Pe, the VPT filter computation processing units 581-1 and 581-2 decides to use the HRTFs of SR-ch(e) of the 7-channel surround, and updates the VPT filter value at a time t6 (a sixth order) after a predetermined interval time elapses from the times t4 and t5. The VPT processing unit 582-2 convolutes the HRTFs of the SR-ch(e) into a sound signal according to the VPT filter value. Accordingly, the waveform of the VPT-processed sound signal to which the HRTFs of the SR-ch(e) are applied is reproduced from the headphones 207 of the HMD 20.

As the series of processes are performed as described above, the sound reproduced (output) from the headphones 207 of the HMD 20 can be heard as if the "p" sound sequentially moves through the stereoscopic positions of the position Pa, the position Pb, the position Pd, and the position Pe, and the "p" sound sequentially moves through the stereoscopic positions of the position Pa, the position Pg, the position Pf, and the position Pe regardless of the fact that the 2-channel headphones are being used. Note that the "p" sound given as sound information of the sound object is an example, and another single sound may be used.

(Sound Processing of an Intermediate Position)

Figure 28:
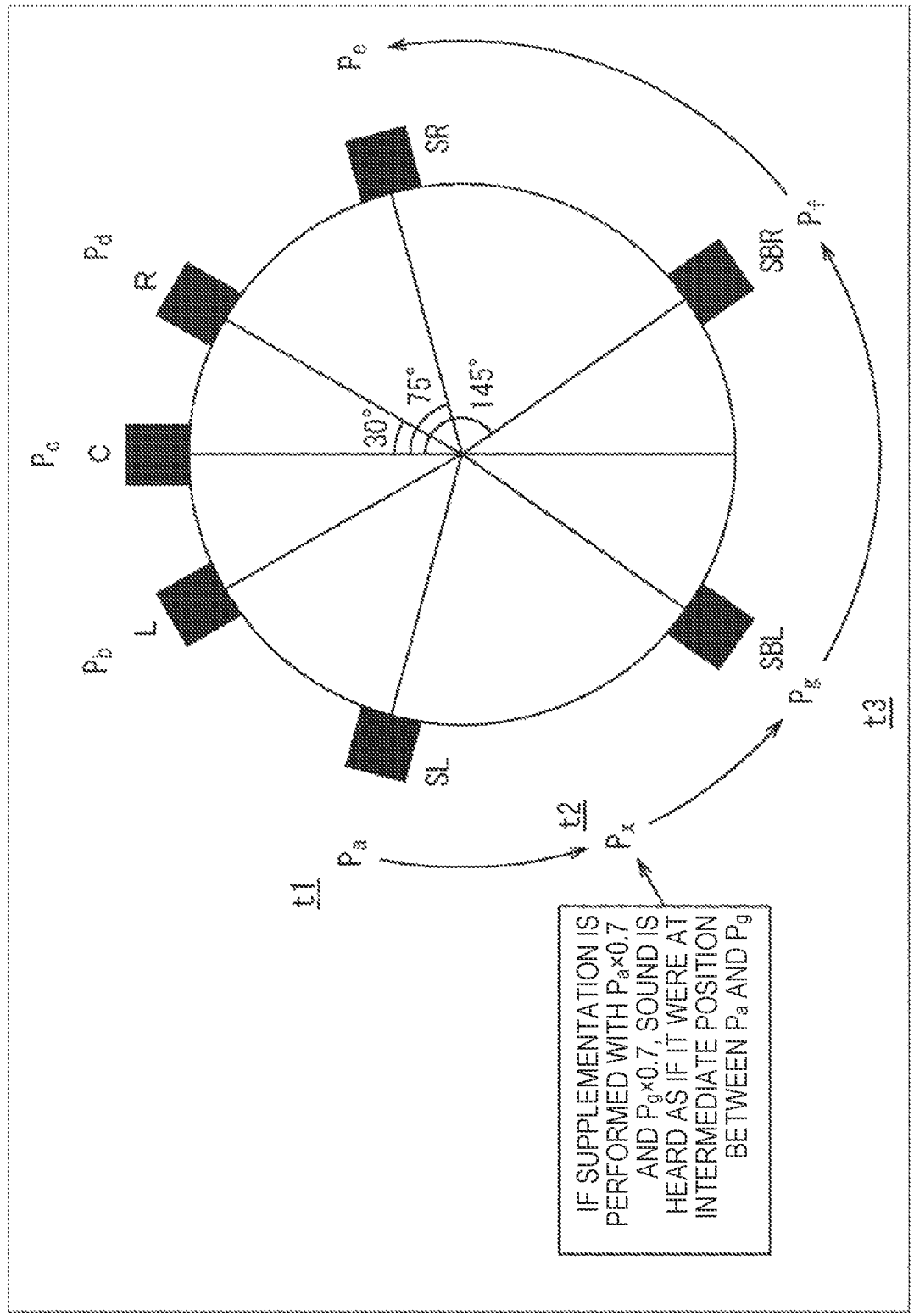
FIG. 28 is a diagram for describing sound processing at an intermediate position.

FIG. 28 is a diagram for describing sound processing at an intermediate position on the first sound path.

As shown in FIG. 28, a case in which a trajectory that sequentially passes through the position Pg and the position Pf from the position Pa (the starting point) to the position Pe (the end point) is set as a trajectory of a sound object is assumed. In this case, it is possible to continuously move a sound object by causing a sound to be output at an intermediate position between the positions when, for example, sound information is a continuous sound like "p," in comparison to scattered positions such as the position Pa, the position Pg, the position Pf, and the position Pe.

Specifically, when object direction information indicates the position Pa that serves as the starting point of the trajectory, the VPT filter computation processing unit 581-1 decides to use the HRTFs of the SL-ch(a) of the 7-channel surround, and updates the VPT filter value at a time t1 (a first order). However, silence is assigned to the channels corresponding to the positions Pb to Pg. The VPT processing unit 582-1 convolutes the HRTF of the SL-ch(a) for the left ear into a sound signal according to the VPT filter value. In addition, the HRTF of the SL-ch(a) for the right ear is separately convoluted into the sound signal likewise. In this example of sound processing at an intermediate position, a sound object is only for one direction and there is one sound path, and thus the mixing unit 572 outputs the sound signal VPT-processed by the VPT processing unit 582-1 to the headphones 207 of the HMD 20. Accordingly, for example, the waveform of the VPT-processed sound signal is reproduced from the headphones 207 of the HMD 20.

Next, when the object direction information indicates a position Px that is an intermediate position between the position Pa and the position Pg, the VPT filter computation processing unit 581-1 decides to use the HRTFs of the SL-ch(a) and the HRTFs of the SL-ch(g) of the 7-channel surround, and updates the VPT filter value at a time t2 (a second order) after a predetermined interval time elapses from the time t1. However, silence is assigned to the channels corresponding to the positions Pb to Pf. The VPT processing unit 582-1 convolutes the HRTF of the SL-ch(a) for the left ear into the waveform of the way file format (for example, a "p" sound) input as a sound signal according to the VPT filter value. In addition, the HRTF of the SL-ch(a) for the right ear is separately convoluted into the sound signal in a similar manner. Further, the VPT processing unit 582-1 convolutes the HRTF of the SL-ch(g) for the left ear into the waveform of the way file format (for example, the "p" sound) input as a sound signal according to the VPT filter value. In addition, the HRTF of the SL-ch(g) for the right ear is separately convoluted into the sound signal in a similar manner.

However, although the position Px is gain of both the SL-ch(a) and the SL-ch(g), it is an intermediate position between the position Pa and the position Pg, and thus the same gain is given. For example, the value of the SL-ch(a) is multiplied by 0.7 and the value of the SL-ch(g) is multiplied by 0.7, and the output obtained by a combination thereof can be equal to a single output from the position Pa. Accordingly, the waveform of the VPT-processed sound signals to which the HRTFs of the SL-ch(a) and the SL-ch(g) are applied is reproduced from the headphones 207 of the HMD 20, and thus the "p" sound can also be heard from the position Px that is an intermediate position between the position Pa and the position Pg.

Thereafter, the VPT process is performed at the position Pg, the position Pf, and the position Pe in the same manner as the basic sound processing of FIG. 26, and with regard to the sound processing at an intermediate position, the same VPT process as at the position Px that is an intermediate position is also performed at an intermediate position between the position Pg and the position Pf and an intermediate position between the position Pf and the position Pe, and thus the "p" sound can also be heard from these intermediate positions.

As the series of processes are performed as described above, a sound reproduced (output) from the headphones 207 of the HMD 20 can be heard as if were sequentially moving not only to the stereoscopic positions of the position Pa, the position Pg, the position Pf, and the position Pe but also to the intermediate positions of the above positions, and thus the "p" sound continuously moves, regardless of the fact that the 2-channel headphones are being used.

(Sound Processing of a Continuous Sound)

Figure 29:
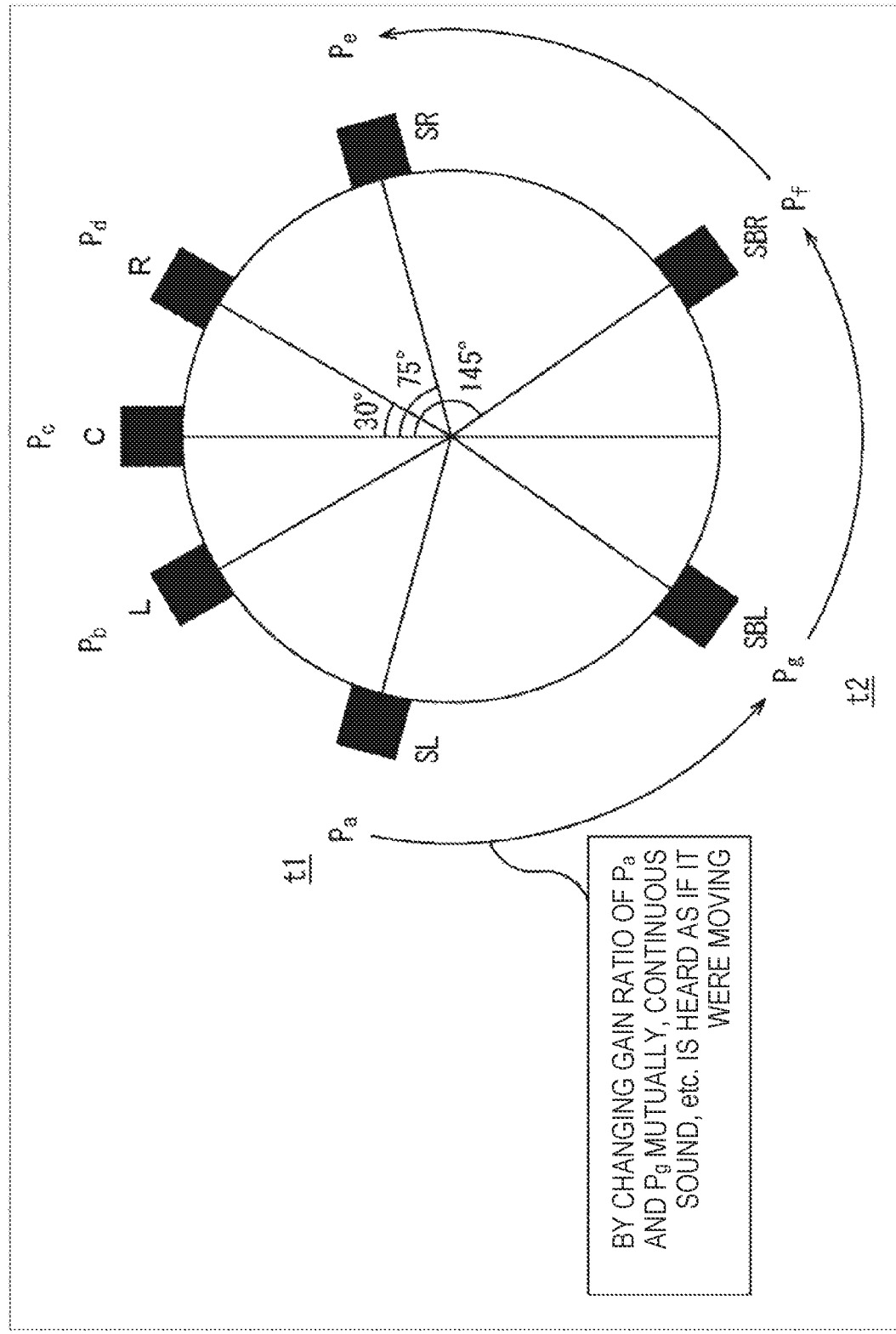
FIG. 29 is a diagram for describing sound processing of a continuous sound.

FIG. 29 is a diagram for describing sound processing of a continuous sound on the first sound path.

As shown in FIG. 29, a case in which a trajectory that sequentially passes through the position Pg and the position Pf from the position Pa (the starting point) to the position Pe (the end point) is set as a trajectory of a sound object is assumed. In this case, it is possible to continuously move a sound object by causing a sound to be output at each section between the positions when, for example, sound information is a continuous sound like "p," in comparison to scattered positions such as the position Pa, the position Pg, the position Pf, and the position Pe.

Specifically, when object direction information indicates the position Pa that serves as the starting point of the trajectory, the VPT filter computation processing unit 581-1 decides to use the HRTFs of the SL-ch(a) of the 7-channel surround, and updates the VPT filter value at a time t1 (a first order). However, silence is assigned to the channels corresponding to the positions Pb to Pg. The VPT processing unit 582-1 convolutes the HRTF of the SL-ch(a) for the left ear into a sound signal according to the VPT filter value. In addition, the HRTF of the SL-ch(a) for the right ear is separately convoluted into the sound signal likewise. In this example of an intermediate position, a sound object is only for one direction and there is one sound path, and thus the mixing unit 572 outputs the sound signal VPT-processed by the VPT processing unit 582-1 to the headphones 207 of the HMD 20. Accordingly, for example, the waveform of the VPT-processed sound signal is reproduced from the headphones 207 of the HMD 20.

Next, when the object direction information indicates the position Pg, the VPT filter computation processing unit 581-1 decides to use the HRTFs of the SL-ch(a) and the SBL-ch(g) of the 7-channel surround, and updates the VPT filter value at a time t2 (a second order) after a predetermined interval time elapses from the time t1. However, silence is assigned to the channels corresponding to the positions Pb to Pf. The VPT processing unit 582-1 convolutes the HRTF of the SL-ch(a) for the left ear into the waveform of the way file format (for example, a "p" sound) input as a sound signal according to the VPT filter value. Further, the VPT processing unit 582-1 convolutes the HRTF of the SBL-ch(g) for the left ear into the waveform of the way file format (for example, the "p" sound) input as a sound signal according to the VPT filter value. In addition, the HRTF of the SL-ch(a) for the right ear and the HRTF of the SBL-ch(g) for the right ear are separately convoluted into the sound signals likewise.

Here, with regard to the gain ratio of both the SL-ch(a) and the SBL-ch(g) at the positions Pa to Pg, while the level of the SL-ch(a) is shifted from the maximum value to the minimum value, for example, the level of the SBL-ch(g) is shifted from the minimum value to the maximum value, and thereby their gain ratios are changed. Accordingly, the waveform of the VPT-processed sound signals is reproduced from the headphones 207 of the HMD 20, and the continuous sound "p" can be heard in the section of the positions Pa to Pg.

Thereafter, although the VPT process is performed at the position Pg, the position Pf, and the position Pe in the same manner as the basic sound processing of FIG. 26, with regard to sound processing of a continuous sound, the same VPT process performed in the section of the positions Pa to Pg is performed in each section of the above positions, and thus the continuous sound "p" can be heard not only in the section of positions Pg to Pf but the section of the positions Pf to Pe. In other words, in all sections from the starting point to the end point, the "p" sound can be heard as if it were continuously moving.

Note that, although a continuous sound is output in the section of the positions Pa to Pg using channel information of the position Pa that is one before the position Pg in the sound processing of a continuous sound described above, for example, if channel information of the next position Pf can be obtained, the information may be used to output a continuous sound in the section of the positions Pa to Pg. Accordingly, a sound can be heard by the user 2 more satisfactorily as if it were continuously moving.

(Second Sound Path)

Figure 30:
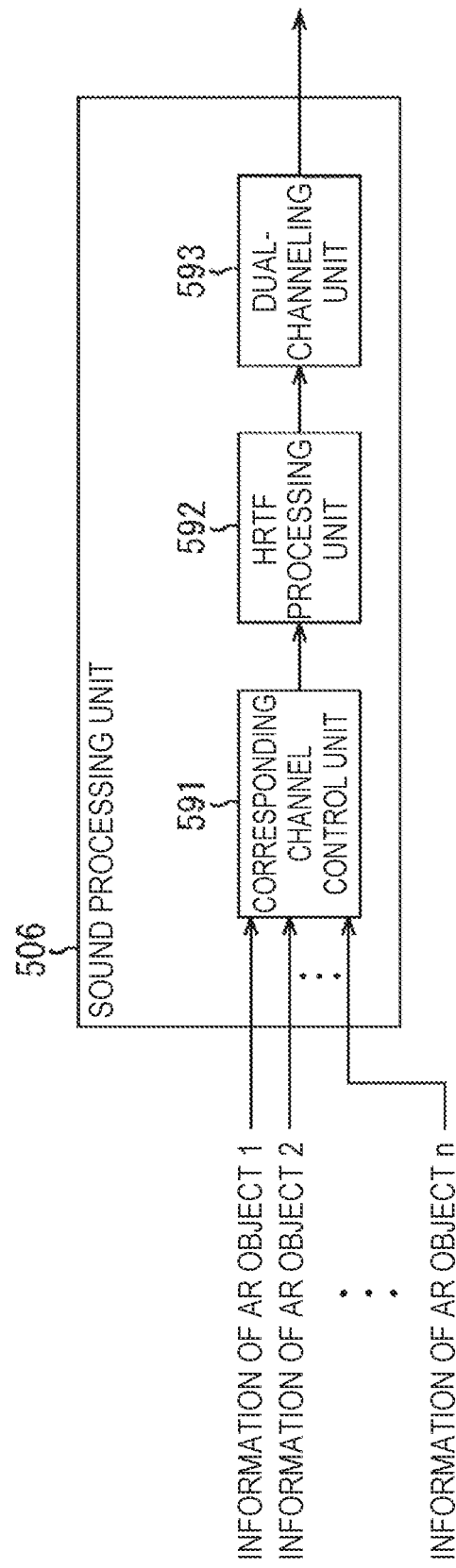
FIG. 30 is a diagram for describing a second sound path of an AR object.

FIG. 30 is a diagram for describing a second sound path of an AR object. As shown in FIG. 30, the sound processing unit 506 includes a corresponding channel control unit 591, an HRTF processing unit 592, and a dual-channeling unit 593.

The corresponding channel control unit 591 receives input of information of AR objects 1 to n (n is an integer equal to or greater than 1). When receiving input of information of a plurality of AR objects, the corresponding channel control unit 591 generates a mixed sound and disposes the sound on a predetermined channel according to the information of each of the AR objects. In addition, the corresponding channel control unit 591 decides an HRTF to be used, and supplies the HRTF to the HRTF processing unit 592.

The HRTF processing unit 592 convolutes the HRTF into the waveform of a sound signal according to the HRTF supplied from the corresponding channel control unit 591. The dual-channeling unit 593 performs dual-channeling on the sound signal from the HRTF processing unit 592 according to the number of final output channels, and outputs the result to the headphones 207 of the HMD 20.

Note that the corresponding channel control unit 591 may have a file (for example, a file in the way format) that moves channels prepared in advance, cause the file to be reproduced at a predetermined timing, then cause the HRTF processing unit 592 to convolute the HRTF of each of the channels thereinto, and cause the dual-channeling unit 593 to perform dual-channeling on the result.

(Basic Sound Processing)

Figure 31:
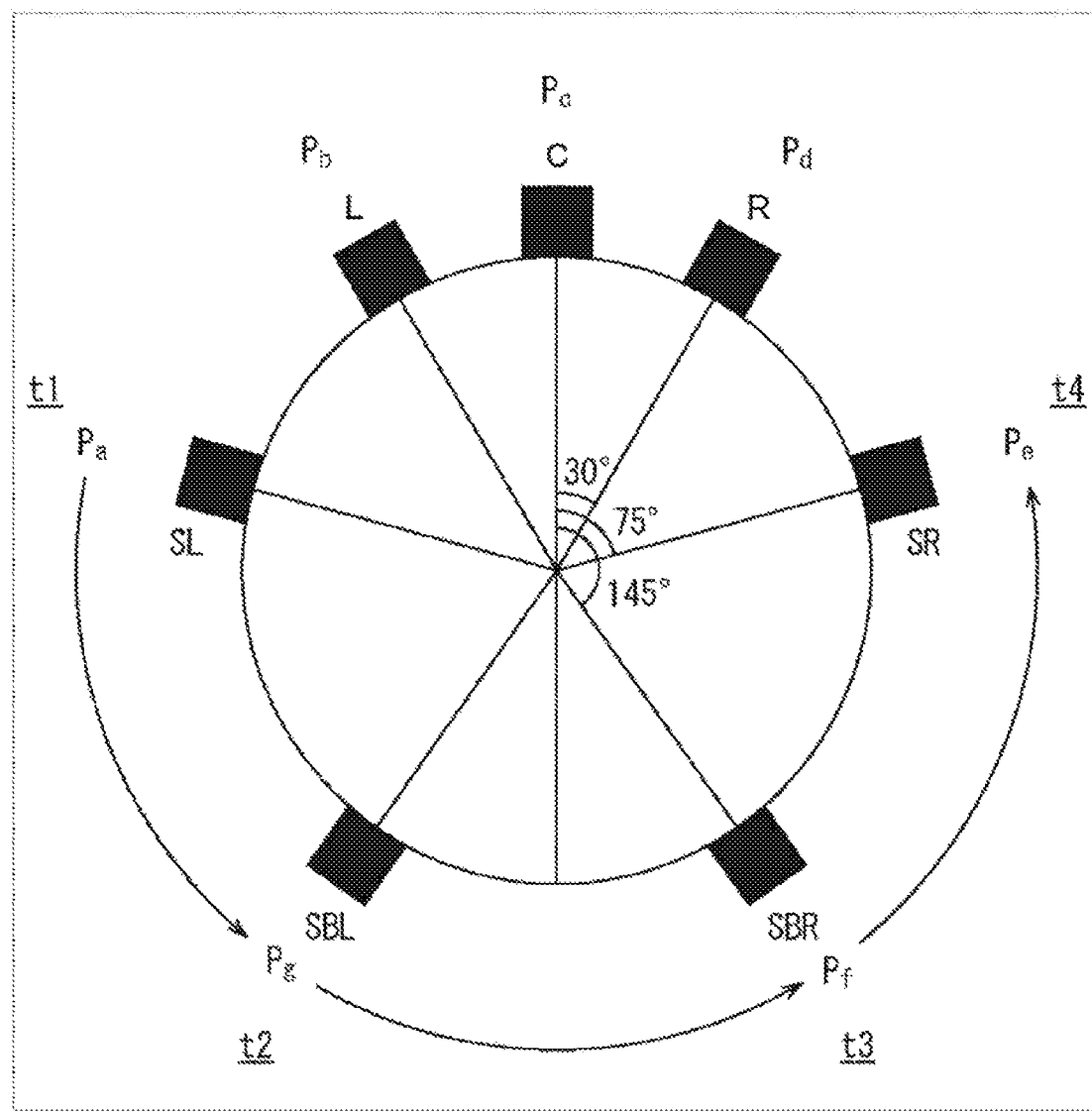
FIG. 31 is a diagram for describing basic sound processing.

FIG. 31 is a diagram for describing basic sound processing of the second sound path.

A case in which a trajectory that sequentially passes through a position Pg and a position Pf from a position Pa (a starting point) to a position Pe (an end point) is set as a trajectory of a sound object is assumed as shown in FIG. 31. In this case, positions of the sound object substantially coincide with the disposition of the speakers of the 7-channel surround, and thus the sound object moving in one direction may be assigned with the HRTFs of the speakers corresponding to the positions of the sound object.

Specifically, the corresponding channel control unit 591 decides to use the HRTFs of the position Pa, i.e., the SL-ch(a) of the 7-channel surround according to object direction information and assigns silence to the channels corresponding to other positions Pb to Pg at a time t1 (a first order). In this example, however, there is one AR object (only in one direction), and thus nothing is further supplemented. Then, the HRTF processing unit 592 convolutes the HRTF of the SL-ch(a) for the left ear into the waveform of the way file format (for example, a "p" sound) input as a sound signal. In addition, the HRTF of the SL-ch(a) for the right ear is separately convoluted into the sound signal in a similar manner. Then, the dual-channeling unit 593 performs dual-channeling on the sound signal having 7 channels according to the number of final output channels, and outputs the result to the headphones 207 of the HMD 20. Accordingly, the waveform of the VPT-processed sound signal is reproduced from the headphones 207 of the HMD 20.

Next, when the object direction information indicates the position Pg, the corresponding channel control unit 591 decides to use the HRTFs of the SBL-ch(g) of 7-channel surround at a time t2 (a second order) after a predetermined interval time elapses from the time t1. Then, the HRTF processing unit 592 convolutes the HRTF of the SBL-ch(g) for the left ear into the waveform of the way file format input as a sound signal. In addition, the HRTF of the SBL-ch(g) for the right ear is separately convoluted into the sound signal in a similar manner. Then, the dual-channeling unit 593 performs dual-channeling on the sound signal having 7 channels, and thereby the waveform of the VPT-processed sound signals is reproduced from the headphones 207 of the HMD 20.

Next, when the object direction information indicates the position Pf, the corresponding channel control unit 591 decides to use the HRTFs of the SBR-ch(f) of 7-channel surround at a time t3 (a third order) after a predetermined interval time elapses from the time t2. Then, the HRTF processing unit 592 convolutes the HRTF of the SBR-ch(f) for the left ear into the waveform of the way file format input as a sound signal. In addition, the HRTF of the SBR-ch(f) for the right ear is separately convoluted into the sound signal in a similar manner. Then, the dual-channeling unit 593 performs dual-channeling on the sound signal having 7 channels, and thereby the waveform of the VPT-processed sound signals is reproduced from the headphones 207 of the HMD 20.

Subsequently, when the object direction information indicates the position Pe, the corresponding channel control unit 591 decides to use the HRTFs of the SR-ch(e) of 7-channel surround at a time t4 (a fourth order) after a predetermined interval time elapses from the time t3. Then, the HRTF processing unit 592 convolutes the HRTF of the SR-ch(e) for the left ear into the waveform of the way file format input as a sound signal. In addition, the HRTF of the SR-ch(e) for the right ear is separately convoluted into the sound signal in a similar manner. Then, the dual-channeling unit 593 performs dual-channeling on the sound signal having 7 channels, and thereby the waveform of the VPT-processed sound signals is reproduced from the headphones 207 of the HMD 20.

As the series of processes are performed as described above, the sound reproduced (output) from the headphones 207 of the HMD 20 can be heard as if the "p" sound were sequentially moving to the stereoscopic positions of the position Pa, the position Pg, the position Pf, and the position Pe regardless of the fact that the 2-channel headphones are being used.

(Modified Example)

Although the examples in which a sound object moves at a constant speed have been described with regard to the sound processing described above, a sound object may not necessarily move at a constant speed. In other words, a movement speed of a sound object is changeable as long as the user 2 can satisfactorily hear movement of a sound.

In addition, although the "p" sound given as sound information is an example and another single sound can be used as described above, it is not limited to any single sound, and other combined sounds may be further used. In short, any sound can be used as long as the user 2 can satisfactorily hear movement of the sound.

Furthermore, in the sound-added AR object correspondence process 2 of FIG. 15, the trajectory shown in FIG. 17 has been described as being set as a trajectory of a sound object in the process of Step S543. On the trajectory of FIG. 17, the sound object sequentially moves through the positions P1 to P5 rather than in the left-right direction, which is movement from a distant place to a nearby place in the cylindrical coordinate system C. In that case, although the sound object does not move in the horizontal direction, the magnitude of the sound or the like can be changed according to a position through sound processing.

In FIG. 17, for example, if the volume of the position P1 that is a distant place is set to 1.0, the volume of the position P2 can be set to 1.1 times the volume of the position P1, the volume of the position P3 can be set to 1.2 times the volume of the position P1, the volume of the position P4 can be set to 1.3 times the volume of the position P1, and the volume of the position P5 can be set to 1.4 times the volume of the position P1. In addition, in FIG. 17, with regard to an HRTF reverberation amount (FIG. 24) at the position P1 that is a distant place, for example, the reverberation amount may set to be gradually decrease each time a sound approaches the positions P2, P3, P4, and P5. By performing such sound processing, it is possible to give, for example, an impression of an approaching sound to the user 2. Note that the sound processing is an example, and another type of sound processing can be applied as long as the user 2 can satisfactorily hear movement of a sound through the sound processing.

In addition, although the configuration in which a sound object moves in the horizontal direction in the 7-channel surround of the above-described VPT has been described, a configuration in which a sound object moves not only in the horizontal direction but also in the vertical direction can be employed by adopting a VPT configuration in an upper direction, for example, by disposing front-high speakers (L (FH) and R (FH)) at positions immediately above front speakers (L and R). Furthermore, a more stereoscopic sound object can be configured by adopting a VPT configuration in which multiple channels more than the 7 channels described above are employed.

When, for example, the front-high speakers are disposed to cause a sound object to move in the vertical direction, and thus the sound object moves to an upper place and a lower place outside the display region A as the user 2 shakes his or her head up and down, and control of matching the height of the sound object with the central height of the display region A of the HMD 20 or the like is performed as shown in FIG. 20.

In the example of FIG. 20 described above, both the sound object and the sound object image thereof move close to the center of the display region A, but only the sound object image may move into the display region A while the height of the sound object is maintained. In other words, while the sound object is separated from the sound object image thereof and sound processing is performed to move the sound object to an upper place or a lower place outside the display region A, the sound object image may be set to pass through the display region A according to the movement of the sound object. At this time, as the sound object image is traversing the display region A, for example, the sound object image itself such as an arrow may be displayed; however, by displaying a shadow of the arrow or the like according to the height of the sound object, the user 2 can more stereoscopically catch movement of the sound.

An output position of the sound of a sound object may be the same as a display position of the sound object image passing through the display region A as described above, or may be different therefrom.

<Specific Operation Examples>

Next, specific operation examples of the AR system 1 of FIG. 1 will be described with reference to FIGS. 32 and 33.

Figure 32:
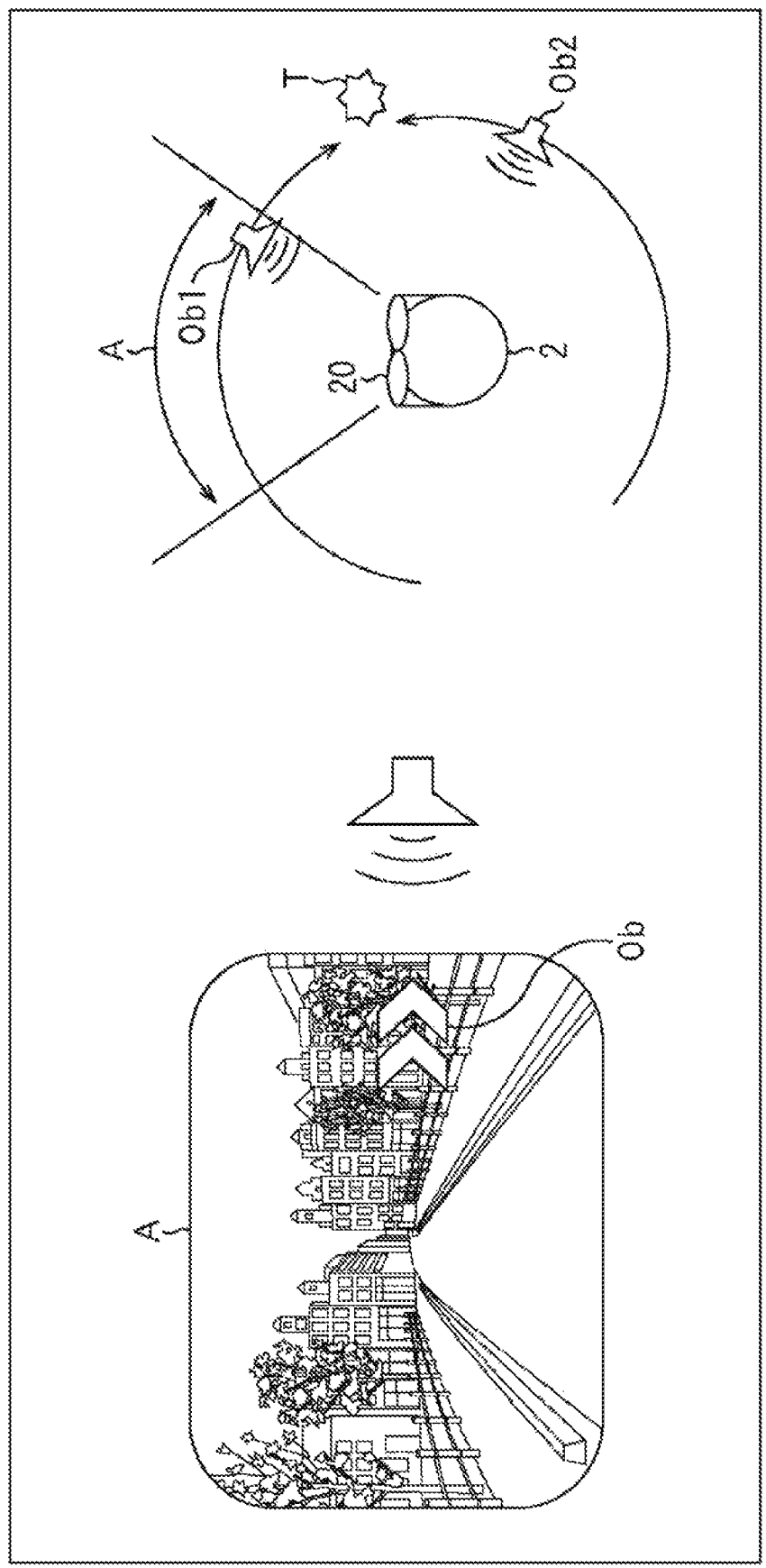
FIG. 32 is a diagram showing a specific operation example 1 of the AR system.

As an operation example 1, a case in which the AR system 1 provides an application for a map search is shown in FIG. 32. For example, when an instruction of indicating the north is given by the application for the map search, the north is designated as a position of a target T. Then, as shown in the drawing in which the cylindrical coordinate system C is viewed from the top on the right side of the drawing, sound objects Ob1 and Ob2 respectively move on both sides of the user 2 toward the position of the target T (in the north) from a predetermined starting point, and then reach close to the position of the target T. As shown in a screen on the left side of the drawing, when a sound is output according to a sound object, and the sound object Ob1 passes through the display region A, a sound object image formed by arrows is displayed.

Since the sound to guide, for example, to the north is output and the image of the arrows indicating the north traverses the display region A as described above, more intuitive position information can be provided to the user 2.

Figure 33:
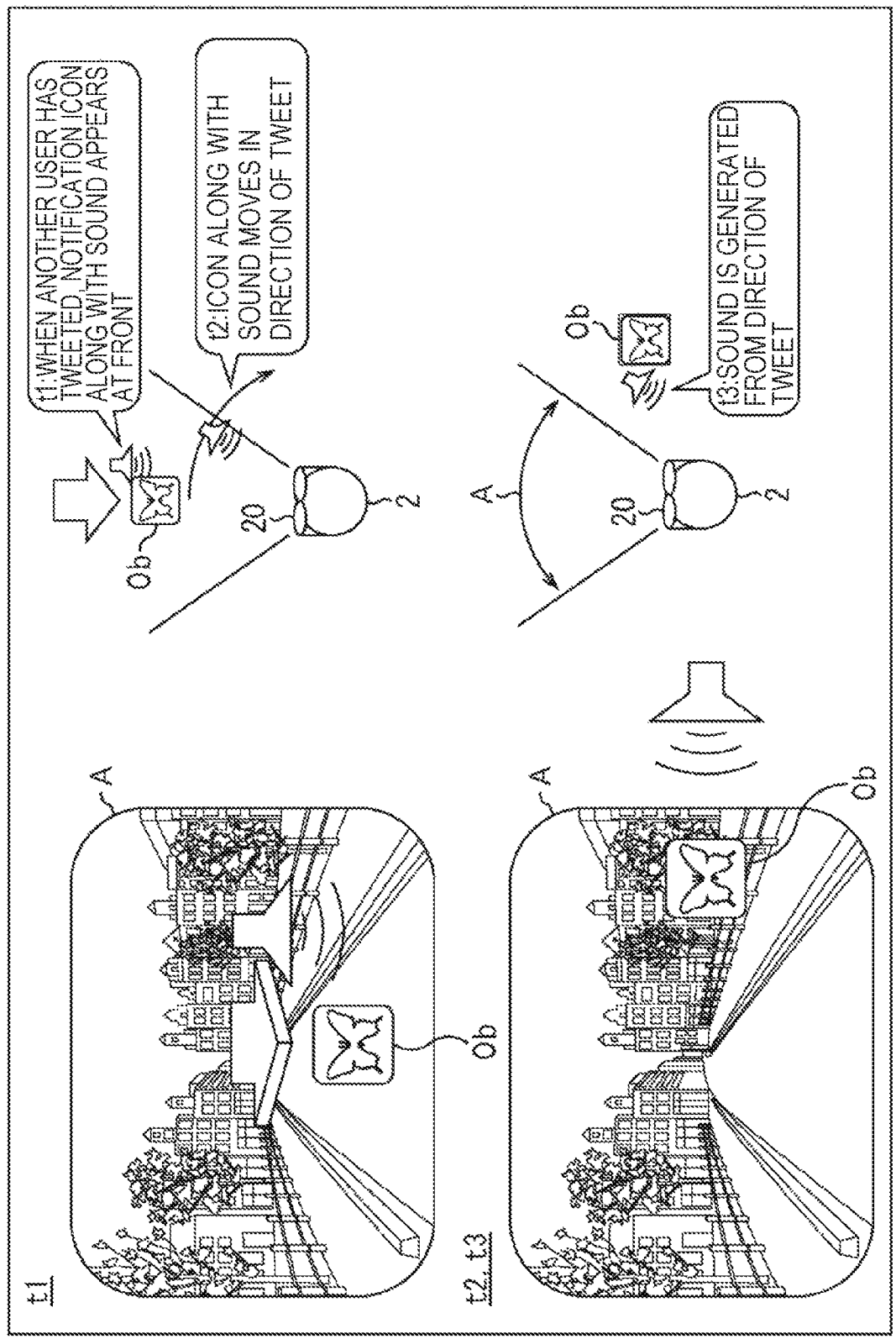
FIG. 33 is a diagram showing a specific operation example 2 of the AR system.

FIG. 33 shows, as an operation example 2, a case in which the AR system 1 provides a social networking service (SNS) application. When another user tweets near a current position of the user 2 during activation of the SNS application, for example, the position at which the other user has tweeted is specified as the position of a target T. Then, along with a sound of a sound object Ob, a notification icon that serves as a sound object image thereof is displayed in the display region A at a time t1. Then, at times t2 and t3 after predetermined interval times elapse from the time t1, the sound object Ob moves toward the position of the tweet while the sound is being output, but when the sound object moves into the display region A, the sound object image formed by the notification icon is displayed.

In the same manner as described above, when another user who is participating in an event tweets about the event, for example, the place of the tweet is indicated by a sound of an AR object and a notification icon, and therefore, the user 2 can immediately move to the place to participate in the event.

<Description of a Computer to which the Present Disclosure is Applied>

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

As one example, the program executed by the computer (CPU) may be provided by being recorded on the removable medium as a packaged medium or the like. The program can also be provided via a wired or wireless transfer medium, such as a local area network, the Internet, or a digital satellite broadcast.

In the computer, by loading the removable medium into the drive, the program can be installed into the recording unit via the input/output interface. It is also possible to receive the program from a wired or wireless transfer medium using the communication unit and install the program into the recording unit. As another alternative, the program can be installed in advance into the ROM or the recording unit.

Note that the program executed by the computer may be a program in which processes are carried out in a time series in the order described in this specification or may be a program in which processes are carried out in parallel or at necessary timing, such as when the processes are called.

A processing step herein for describing a program which causes the computer to perform various processing does not necessarily have to be processed chronologically in the order described in a flow chart. It also includes processing performed in parallel or individually (for example, parallel processing or processing by an object).

The program may be a program executed by a single computer or may be a program executed in a distribution manner by a plurality of computers. The program may be transmitted remotely to a computer to be executed.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

An embodiment of the disclosure is not limited to the embodiments described above, and various changes and modifications may be made without departing from the scope of the disclosure. For example, the present disclosure can adopt a configuration of cloud computing which processes by allocating and connecting one function by a plurality of apparatuses through a network.

Further, each step described by the above-mentioned flow charts can be executed by one apparatus or by allocating a plurality of apparatuses. In addition, in the case where a plurality of processes are included in one step, the plurality of processes included in this one step can be executed by one apparatus or by sharing a plurality of apparatuses.

Additionally, the present technology may also be configured as below.

(1)
An information processing device including:
an image display unit configured to display an image;
a sound output unit configured to output a sound;
a position designation unit configured to designate a position outside a display region of the image display unit; and
a control unit configured to control output of a sound of an augmented reality (AR) object while moving the AR object toward the designated position.

(2)
The information processing device according to (1), wherein the control unit causes an image of the AR object to be displayed when the AR object passes through the display region of the image display unit.

(3)
The information processing device according to (1) or (2), wherein there are a plurality of AR objects.

(4)
The information processing device according to (3), wherein the control unit causes the AR objects to move on both sides of a user when the AR objects move toward the designated position.

(5)
The information processing device according to (3) or (4), wherein the control unit causes sounds of the plurality of AR objects to be output at different timings.

(6)
The information processing device according to (1) or (2), further including: a detection unit configured to detect a direction of the image display unit, wherein the control unit causes the AR object to move according to the direction of the image display unit.

(7)

The information processing device according to (6), wherein the control unit causes the AR object to move in a manner that the image of the AR object is displayed in the display region.

(8)

The information processing device according to (7), wherein the control unit causes an output position of a sound of the AR object to be the same as a display position of the image of the AR object inside the display region.

(9)

The information processing device according to (7), wherein the control unit causes an output position of a sound of the AR object to be different from a display position of the image of the AR object inside the display region.

(10)

The information processing device according to (1), which is a glasses-type device having a pair of the image display units for a left eye and a right eye.

(11)

An information processing method of an information processing device, the method causing the information processing device to perform:

designating a position outside a display region of an image display unit; and controlling output of a sound of an AR object from a sound output unit while moving the AR object toward the designated position.

(12)

A program causing a computer to function as:

a position designation unit configured to designate a position outside a display region of an image display unit; and a control unit configured to control output of a sound of an AR object from a sound output unit while moving the AR object toward the designated position.

REFERENCE SIGNS LIST

1 AR system
10 control box
20 HMD
30 smartphone
40 AR server
101 CPU
107 connection unit
108 wireless communication unit
201 connection unit
203 geo-magnetic sensor
204 gyro sensor
205 acceleration sensor
206 display
207 headphones
301 CPU
309 wireless communication unit
310 mobile communication unit
401 CPU
409 communication unit
410 AR object retaining unit
500 AR processing unit
501 sensor value acquisition unit
502 AR object information acquisition unit
503 HMD direction computation unit
504 display region coordinate computation unit
505 drawing processing unit
506 sound processing unit
507 sound-added AR object handing processing unit
521 outside-display-region-position designation unit
522 trajectory setting unit
523 drawing/sound control unit

What is claimed is:

1. An information processing device, comprising:
    a speaker; and
    a central processing unit (CPU) configured to:
        designate a first position outside of a display region of an image display screen;
        set a trajectory of a sound object, wherein the trajectory of the sound object is set as a plurality of positions in a cylindrical coordinate system; and
        control output, by the speaker, of sound of the sound object based on:
            each of a second position of the display region, a third position of the sound object, and a user's position,
            movement of the sound object towards the designated first position, and
            a first head-related transfer function (HRTF) reverberation amount at the third position of the plurality of positions that is smaller than a second HRTF reverberation amount at a fourth position of the plurality of positions, wherein the third position is closer to the user's position than the fourth position.

2. The information processing device according to claim 1, wherein the information processing device is a glasses-type device.

3. The information processing device according to claim 1, wherein
    the trajectory of the sound object passes through the display region.

4. The information processing device according to claim 1, wherein the CPU is further configured to:
    set a sound object image that corresponds to the sound object; and
    control, based on the movement of the sound object, the image display screen to display the sound object image on the display region.

5. An information processing method, comprising:
    in an information processing device that includes a speaker and a central processing unit (CPU):
        designating, by the CPU, a first position outside of a display region of an image display screen;
        setting, by the CPU, a trajectory of a sound object, wherein the trajectory of the sound object is set as a plurality of positions in a cylindrical coordinate system; and
        controlling, by the CPU, output of sound of the sound object by use of the speaker, based on:
            each of a second position of the display region, a third position of the sound object, and a user's position,
            movement of the sound object towards the designated first position, and
            a first head-related transfer function (HRTF) reverberation amount at the third position of the plurality of positions that is smaller than a second HRTF reverberation amount at a fourth position of the plurality of positions, wherein the third position is closer to the user's position than the fourth position.

6. The information processing method according to claim 5, wherein the information processing device is a glasses-type device.

7. The information processing method according to claim 5,
wherein the trajectory of the sound object passes through the display region.

8. The information processing method according to claim 5, further comprising:
setting, by the CPU, a sound object image that corresponds to the sound object; and
controlling, by the CPU based on the movement of the sound object, the image display screen to display the sound object image on the display region.

9. A non-transitory computer-readable medium having stored thereon computer-executable instructions that, when executed by a processor of an information processing device, cause the processor to execute operations, the operations comprising:
controlling a speaker;
designating a first position outside of a display region of an image display screen;
setting a trajectory of a sound object, wherein the trajectory of the sound object is set as a plurality of positions in a cylindrical coordinate system; and
controlling output of sound of the sound object using the speaker based on:
each of a second position of the display region, a third position of the sound object, and a user's position, movement of the sound object towards the designated first position, and
a first head-related transfer function (HRTF) reverberation amount at the third position of the plurality of positions that is smaller than a second HRTF reverberation amount at a fourth position of the plurality of positions, wherein the third position is closer to the user's position than the fourth position.

10. The non-transitory computer-readable medium according to claim 9, wherein the information processing device is a glasses-type device.

11. The non-transitory computer-readable medium according to claim 9, wherein
the trajectory of the sound object passes through the display region.

12. The non-transitory computer-readable medium according to claim 9, wherein the operation further comprising:
setting a sound object image that corresponds to the sound object; and
controlling, based on the movement of the sound object, the image display screen to display the sound object image on the display region.

* * * * *